United States Patent
Sato et al.

(10) Patent No.: US 12,338,131 B2
(45) Date of Patent: *Jun. 24, 2025

(54) BOEHMITE STRUCTURE AND METHOD FOR PRODUCING SAME

(71) Applicant: Panasonic Intellectual Property Management Co., Ltd., Osaka (JP)

(72) Inventors: Natsuki Sato, Osaka (JP); Naoki Kurizoe, Osaka (JP); Ryosuke Sawa, Osaka (JP); Tatsuro Yoshioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 773 days.

This patent is subject to a terminal disclaimer.

(21) Appl. No.: 17/612,264

(22) PCT Filed: Apr. 17, 2020

(86) PCT No.: PCT/JP2020/016932
§ 371 (c)(1),
(2) Date: Nov. 18, 2021

(87) PCT Pub. No.: WO2020/235277
PCT Pub. Date: Nov. 26, 2020

(65) Prior Publication Data
US 2022/0212943 A1  Jul. 7, 2022

(30) Foreign Application Priority Data

May 20, 2019 (JP) ................................ 2019-094630
Oct. 30, 2019 (JP) ................................ 2019-197102

(51) Int. Cl.
*C01F 7/448* (2022.01)

(52) U.S. Cl.
CPC .......... *C01F 7/448* (2013.01); *C01P 2002/30* (2013.01); *C01P 2002/70* (2013.01);
(Continued)

(58) Field of Classification Search
CPC ............................ C01F 7/448; C01P 2004/61
See application file for complete search history.

(56) References Cited

U.S. PATENT DOCUMENTS

| 4,952,539 A | 8/1990 | Greber |
| 2005/0234137 A1* | 10/2005 | Espinoza ............... C10G 2/332 518/716 |
| 2019/0210926 A1* | 7/2019 | Barclay ................. C04B 35/111 |

FOREIGN PATENT DOCUMENTS

| JP | 46-007164 A | 12/1971 |
| JP | 60-046922 A | 3/1985 |

(Continued)

OTHER PUBLICATIONS

Alphonse, et al. "Surface and porosity of nanocrystalline boehmite xerogels." Journal of colloid and interface science 290.1 (2005): 208-219 (Year: 2005).*

(Continued)

*Primary Examiner* — Anthony J Zimmer
*Assistant Examiner* — Eric Scott Sherman
(74) *Attorney, Agent, or Firm* — Renner, Otto, Boisselle & Sklar, LLP

(57) ABSTRACT

A boehmite structure includes a plurality of boehmite particles where adjacent boehmite particles are bonded to each other. The boehmite structure has a porosity of 30% or less. A method of producing a boehmite structure includes obtaining a mixture by mixing hydraulic alumina with a solvent including water, and pressurizing and heating the mixture under a condition of a pressure of 10 to 600 MPa and a temperature of 50 to 300° C.

12 Claims, 15 Drawing Sheets

(52) U.S. Cl.
CPC ...... *C01P 2004/61* (2013.01); *C01P 2006/16* (2013.01); *C01P 2006/60* (2013.01)

(56) References Cited

FOREIGN PATENT DOCUMENTS

| JP | 2-239114 A | 9/1990 |
|----|------------|--------|
| JP | 2003-238150 A | 8/2003 |
| JP | 2011046810 A | 3/2011 |
| JP | 2011-110438 A | 6/2011 |
| JP | 2012-071996 A | 4/2012 |

OTHER PUBLICATIONS

"Physical Constants of Inorganic Compounds," in CRC Handbook of Chemistry and Physics, 105th Edition (Internet Version 2023), John R. Rumble, ed., CRC Press/Taylor & Francis, Boca Raton, FL (Year: 2023).*

International Search Report for corresponding Application No. PCT/JP2020/016932, mailed Jul. 7, 2020.

Written Opinion for corresponding Application No. PCT/JP2020/016932, mailed Jul. 7, 2020.

Preparation of boehmite solidified by small hot pressing of pyrolytic alumina, vol. 5, No. 6, Dec. 25, 1984, pp. 48-51, p. 4 8, left column first paragraph to p. 4 9, left column first paragraph, p. 4 9, left column third paragraph, p. 4 9, right column second paragraph to p. 51, left column first paragraph, fig. 3, 6, tables 1, 2, abstract, (Yamasaki, Nakamichi et al., Reports of Research Laboratory of Hydrothermal Chemistry), nonofficial translation (Preparation of boehmite solidified by small hot pressing of pyrolytic alumina).

Li, M. et al., Preparation of porous boehmite nanosolid and its composite fluorescent materials by a novel hydrothermal hot-press method, Materials Letters, 2006, vol. 60, pp. 2738-2742, abstract, p. 2738, left column second paragraph to right column first paragraph, p. 2739, left column second paragraph to third paragraph, p. 2740, left column second paragraph, p. 2740, left column fourth paragraph to right column second paragraph, fig. 1, 4, 5.

Nagode, A. et al.; "The effect of sol-gel boehmite coatings on the corrosion and decarburization of C45 steel"; Journal of Sol-Gel Science and Technology; May 3, 2018; vol. 86, pp. 568-579.

* cited by examiner

REFLECTION ELECTRON IMAGE OF TEST SAMPLE 1 (POSITION 1)

BINARIZED DATA OF TEST SAMPLE 1 (POSITION 1)

REFLECTION ELECTRON IMAGE OF TEST SAMPLE 1 (POSITION 2)

BINARIZED DATA OF TEST SAMPLE 1 (POSITION 2)

REFLECTION ELECTRON IMAGE OF TEST SAMPLE 1 (POSITION 3)

BINARIZED DATA OF TEST SAMPLE 1 (POSITION 3)

FIG. 13
(a)
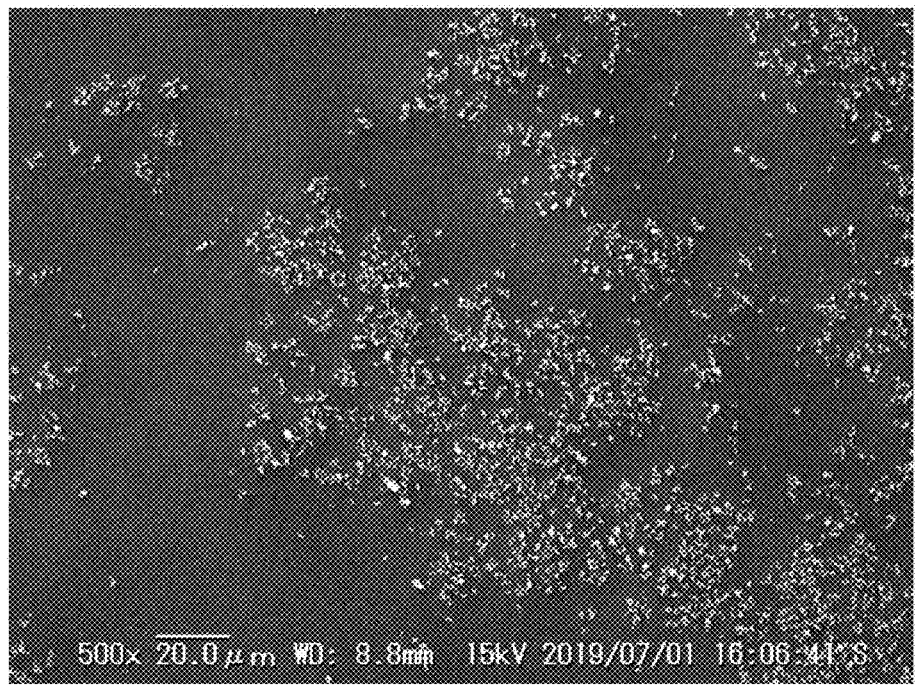
(b)
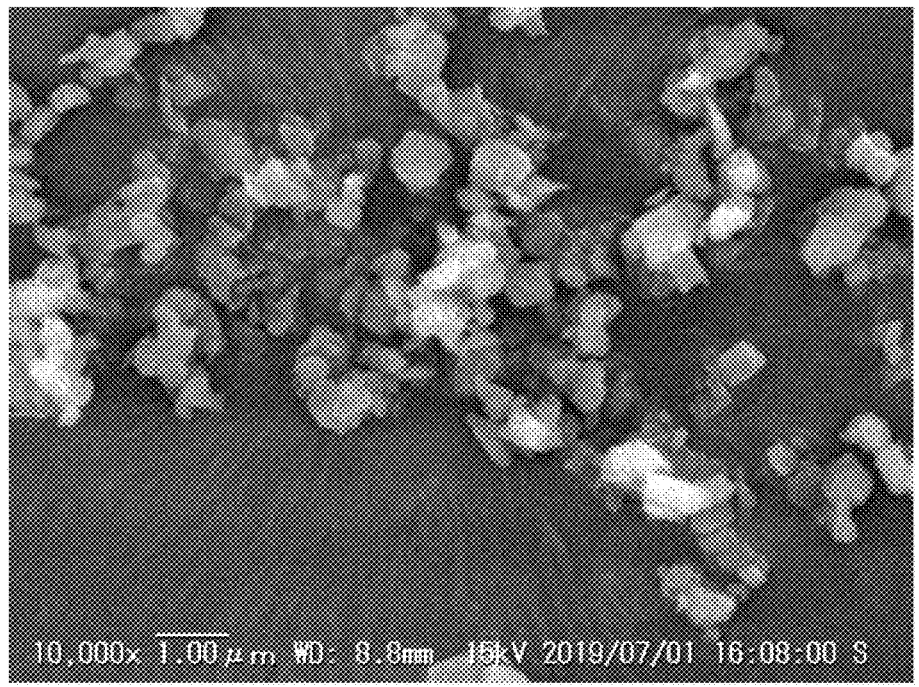

SECONDARY ELECTRON IMAGE OF TEST SAMPLE 9 (POSITION 1)

BINARIZED DATA OF TEST SAMPLE 9 (POSITION 1)

SECONDARY ELECTRON IMAGE OF TEST SAMPLE 9 (POSITION 2)

BINARIZED DATA OF TEST SAMPLE 9 (POSITION 2)

SECONDARY ELECTRON IMAGE OF TEST SAMPLE 9 (POSITION 3)

BINARIZED DATA OF TEST SAMPLE 9 (POSITION 3)

BOEHMITE STRUCTURE AND METHOD FOR PRODUCING SAME

TECHNICAL FIELD

The present invention relates to a boehmite structure and a method for producing the boehmite.

BACKGROUND ART

Boehmite is an aluminum oxide hydroxide represented by a formula of AlOOH. Boehmite is insoluble in water and hardly reacts with acids and alkalis at normal temperature, and thus has high chemical stability and also excellent heat resistance due to its high dehydration temperature of around 500° C. The powder of boehmite having such properties is used as a resin additive, a catalyst raw material, and an abrasive.

Boehmite has a specific gravity of about 3.07. It is thus awaited to develop a structure that is lightweight and excellent in chemical stability and heat resistance by using boehmite. Patent Literature 1 discloses that a porous boehmite molded body is obtained by hydrothermal treatment of a mixture made from an aluminum hydroxide, a reaction promoter, and water at a temperature of 140° C. to less than 350° C. In the porous boehmite molded body, plate-like or needle-like boehmite crystals have a continuous crystalline structure, and are connected to each other to form continuous pores, and the porous boehmite molded body have a porosity of 65% or more, and have a flexural strength of 400 N/cm$^2$ or more.

CITATION LIST

Patent Literature

Patent Literature 1: Japanese Unexamined Patent Application Publication No. 2003-238150

SUMMARY OF INVENTION

However, since a sodium or calcium hydroxide is used as a reaction promoter in Patent Literature 1, such a substance remains as impurities in the obtained structure. Thus, it is difficult to obtain a boehmite structure that maintains properties inherent to boehmite in the method of Patent Literature 1. When the boehmite powder is sintered at a high temperature to obtain a structure, the crystalline structure of the boehmite changes to that of α-alumina having a high specific gravity (specific gravity 3.98), so that a lightweight boehmite structure is not obtained.

The present invention has been made in consideration of such an issue as described above, which is inherent in related art. An object of the present invention is to provide a boehmite structure that is lightweight, and has excellent chemical stability and a reduced amount of impurities, and to provide a method of producing a boehmite structure.

To solve the above issue, a boehmite structure according to a first aspect of the present invention includes a plurality of boehmite particles where adjacent boehmite particles are bonded to each other. The boehmite structure has a porosity of 30% or less.

A method of producing a boehmite structure according to a second aspect of the present invention includes: obtaining a mixture by mixing hydraulic alumina with a solvent including water; and pressurizing and heating the mixture under a condition of a pressure of 10 to 600 MPa and a temperature of 50 to 300° C.

BRIEF DESCRIPTION OF DRAWINGS

FIG. 13($a$) is a scanning electron micrograph illustrating hydraulic alumina used to prepare test sample 8 of example 5. FIG. 13($b$) is an enlarged photograph of the scanning electron micrograph of FIG. 13($a$).

FIG. is a diagram illustrating a secondary electron image at position 3 in test sample 9 of example 6.

Figure 21:
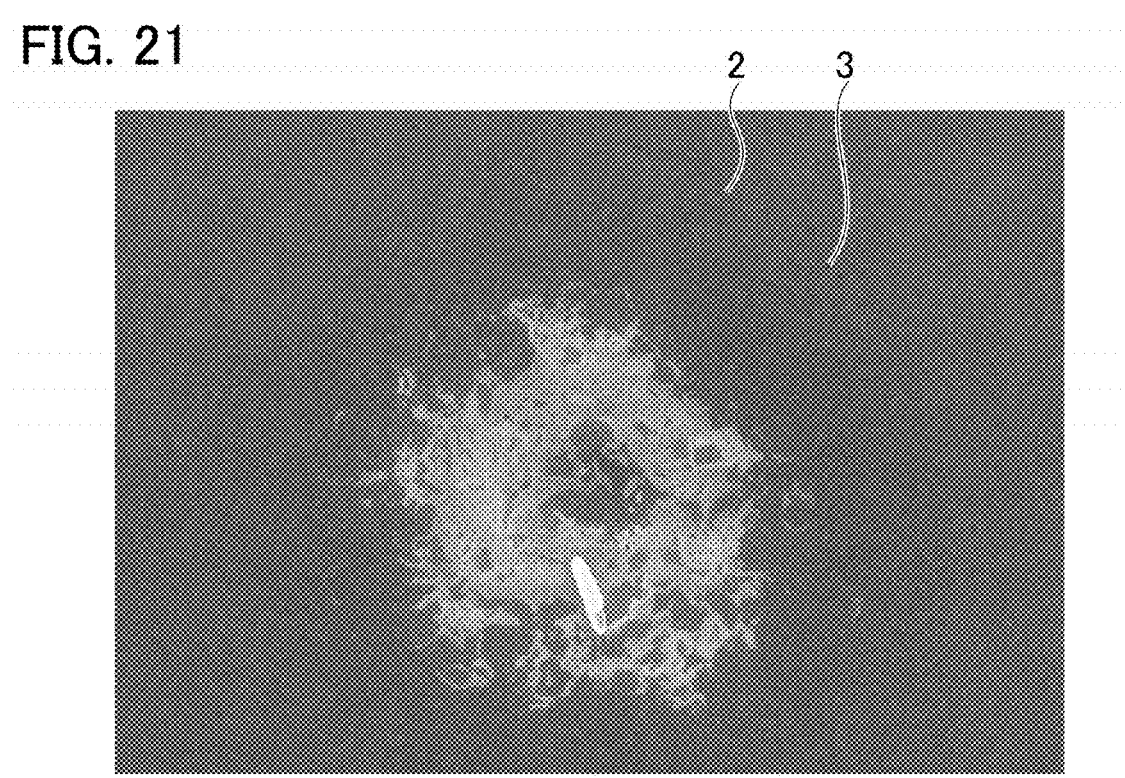

FIG. 21 is a diagram illustrating binarized data of the secondary electron image at position 3 in test sample 9 of example 6.

DESCRIPTION OF EMBODIMENTS

Referring to the drawings, a description is given below of a boehmite structure according to a present embodiment, and a method of producing the boehmite structure. Note that dimensional ratios in the drawings are exaggerated for convenience of explanation and are sometimes different from actual ratios.

[Boehmite Structure of First Embodiment]

Figure 1:
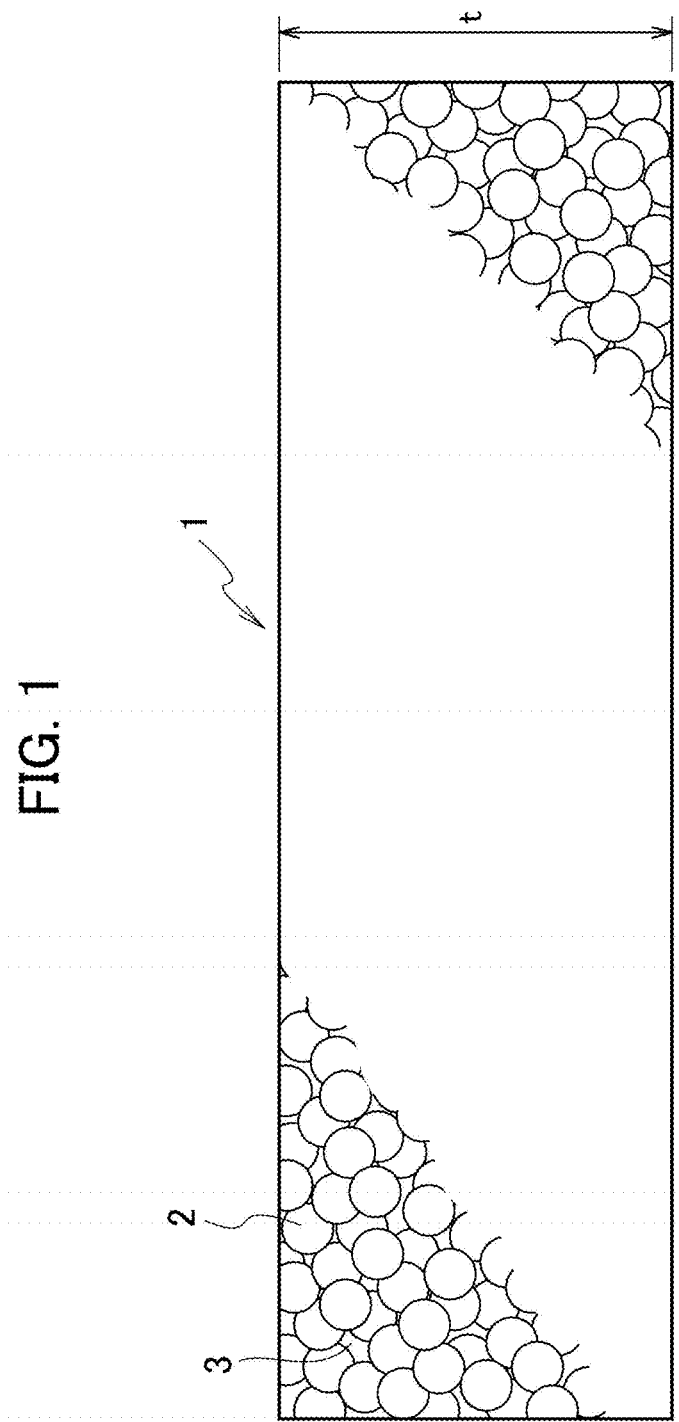
FIG. 1 is a schematic sectional view of an example of a boehmite structure according to a present embodiment.

As illustrated in FIG. 1, a boehmite structure 1 according to the present embodiment includes a plurality of boehmite particles 2. Adjacent boehmite particles 2 are bonded to each other to form the boehmite structure 1 formed by combining boehmite particles 2. Further, there are pores 3 among the adjacent boehmite particles 2.

The boehmite particles 2 may be particles made from only a boehmite phase or may be particles made from a mixed phase of boehmite, and an aluminum oxide or an aluminum hydroxide other than boehmite. For example, the boehmite particles 2 may be particles in which a phase made from boehmite and a phase made from gibbsite (Al $(OH)_3$) are mixed.

The average particle diameter of the boehmite particles 2 making up the boehmite structure 1 is not limited but is preferably from 300 nm to 50 µm, more preferably from 300 nm to 30 µm, particularly preferably from 300 nm to 20 µm. When the average particle diameter of the boehmite particles 2 is within this range, the boehmite particles 2 are firmly bonded to each other, which enhances the strength of the boehmite structure 1. When the average particle diameter of the boehmite particles 2 is within this range, the percentage of pores in the boehmite structure 1 is 30% or less, as is described later, which enhances the strength of the boehmite structure 1. In this description, the value of the "average particle diameter" is, unless otherwise stated, a value calculated as an average value of particle diameters of particles observed in several to several tens of visual fields by using observation means, such as a scanning electron microscope (SEM) or a transmission electron microscope (TEM).

The shape of the boehmite particles 2 is not limited but may be spherical, for example. The boehmite particles 2 may be particles having the shape of a whisker (needle) or particles having the shape of a scale. The whisker-shaped particles or scale-shaped particles have a higher contact with other particles than the spherical particles, which enhances the strength of the entire boehmite structure 1.

As described above, the boehmite structure 1 is made from a particle group of boehmite particles 2. That is, the boehmite structure 1 is made from a plurality of boehmite particles 2 mainly made from boehmite, and the boehmite structure 1 is formed by bonding the boehmite particles 2 to each other. In this case, the boehmite particles 2 may be in point contact with each other, or particle surfaces of the boehmite particles 2 may be in surface contact with each other.

Here, adjacent boehmite particles 2 are bonded through at least one of an oxide or a hydroxide of aluminum. That is, the boehmite particles 2 are not bonded by an organic binder made from an organic compound, and are not bonded by an inorganic binder made from an inorganic compound other than an oxide and a hydroxide of aluminum. As is described later, the boehmite structure 1 is formed by heating a mixture of hydraulic alumina and water under pressure. Note that the hydraulic alumina is a compound produced by heat treatment of an aluminum hydroxide and has ρ-alumina as the main phase. As described above, since the boehmite structure 1 does not include any impurities derived from a reaction promoter included in the molded body of Patent Literature 1, the boehmite structure 1 maintains properties inherent to boehmite.

The boehmite structure 1 has at least a boehmite phase made from boehmite (AlOOH) but may also have other crystalline phase other than the boehmite phase. Examples of other crystalline phase other than the boehmite phase of the boehmite structure 1 include a gibbsite phase made from an aluminum hydroxide (Al$(OH)_3$), and a γ-alumina phase made from an alumina oxide ($Al_2O_3$). However, preferably, the boehmite structure 1 is mainly made from the boehmite phase. As described above, since boehmite is lightweight and has higher chemical stability and heat resistance, mainly using the boehmite phase provides the boehmite structure 1 that is lightweight and excellent in chemical stability and heat resistance.

In the boehmite structure 1, the percentage of presence of the boehmite phase is preferably 50% by mass or more, more preferably 60% by mass or more, still more preferably 70% by mass or more. Increasing the percentage of the boehmite phase provides the boehmite structure 1 that is lightweight and excellent in chemical stability and heat resistance. Note that the percentage of the boehmite phase in the boehmite structure 1 is determined by measuring an X-ray diffraction pattern of the boehmite structure 1 by an X-ray diffraction method and then performing a Rietveld analysis.

As described above, the boehmite structure 1 may include a gibbsite phase made from an aluminum hydroxide (Al$(OH)_3$) in addition to the boehmite phase. However, since an aluminum hydroxide has reactivity to acids and alkalis, it is preferable to reduce the presence percentage of the gibbsite phase to further increase the chemical stability of the boehmite structure 1. To reduce the presence percentage of the gibbsite phase, the boehmite structure 1 is heated to have the gibbsite phase dehydrated. That is, by heating the boehmite structure 1, a dehydration reaction occurs, which causes the crystalline structure of the gibbsite phase to change to that of the boehmite phase. As a result, the gibbsite phase decreases and the boehmite phase increases, thereby enhancing the chemical stability of the boehmite structure 1. Note that the heating condition of the boehmite structure 1 is not limited as long as the dehydration reaction of the gibbsite phase occurs, but for example, preferably, the boehmite structure 1 is heated to 300° C. or higher in air.

As a method of reducing the presence percentage of the gibbsite phase in the boehmite structure 1, also preferably, the hydraulic alumina, which is a raw material, is heated to reduce the presence percentage of gibbsite in the hydraulic alumina. Specifically, also preferably, hydraulic alumina having a reduced gibbsite by heating the hydraulic alumina to, for example, 300° C. or higher is used. Using such hydraulic alumina with reduced gibbsite as a raw material also reduces the presence percentage of the gibbsite phase in the boehmite structure 1 and enhances the chemical stability of the boehmite structure 1. Note that the boehmite structure 1 is also formed by heating a mixture of the hydraulic alumina with reduced gibbsite and water under pressure as described later.

Preferably, the porosity in the cross section of the boehmite structure 1 is 30% or less. That is, when the cross section of the boehmite structure 1 is observed, preferably, the average value of the percentage of pores per unit area is 30% or less. When the porosity is 30% or less, the bonding ratio of the boehmite particles 2 increases, so that the boehmite structure 1 becomes dense and has increased strength. This improves the machinability of the boehmite structure 1. When the porosity is 30% or less, the occurrence of cracks originating from the pores 3 in the boehmite structure 1 is prevented, so that the flexural strength of the boehmite structure 1 is increased. The porosity in the cross section of the boehmite structure 1 is preferably 20% or less, more preferably 10% or less, still more preferably 5% or less. The smaller the porosity in the cross section of the boehmite structure 1, the more the strength of the boehmite structure 1 is enhanced because the crack originating from the pores 3 is prevented.

In this description, the porosity is determined as follows. First, the cross section of the boehmite structure 1 is observed, and the boehmite particles 2 and the pores 3 are identified. Then, the unit area and the area of the pores 3 in the unit area are measured to obtain the percentage of the pores 3 per unit area. After the percentage of the pores 3 per unit area is obtained at multiple locations, the average value of the percentage of the pores 3 per unit area is used as the porosity. When observing the cross section of the boehmite structure 1, an optical microscope, a scanning electron microscope (SEM), or a transmission electron microscope (TEM) is usable. The unit area and the area of the pores 3 in the unit area may be measured by binarizing an image observed by the microscope.

The size of each of the pores 3 present inside the boehmite structure 1 is not limited, but preferably, it is as small as possible. The smaller size of the pore 3 prevents cracks originating from the pore 3, which increases the strength of the boehmite structure 1 and improves the machinability of the boehmite structure 1. The size of the pore 3 in the boehmite structure 1 is preferably 5 μm or less, more preferably 1 μm or less, still more preferably 100 nm or less. The size of the pore 3 present inside the boehmite structure 1 is determined by observing the cross section of the boehmite structure 1 under a microscope in the same manner as the porosity described above.

The boehmite structure 1 only needs to have a structure in which the boehmite particles 2 are bonded to each other and the porosity is 30% or less. Thus, when the boehmite structure 1 has such a structure, its shape is not limited. The boehmite structure 1 may have the shape of, for example, a plate, a film, a rectangle, a block, a rod, or a sphere. When the boehmite structure 1 has the shape of a plate or a film, a thickness t is not limited but may be, for example, 50 μm or more. The boehmite structure 1 according to the present embodiment is formed by a pressure heating method as described later. Thus, the boehmite structure 1 having a large thickness is easily obtained. Note that the thickness t of the boehmite structure 1 may be 1 mm or more or may be 1 cm or more. The upper limit of the thickness t of the boehmite structure 1 is not limited but may be, for example, 50 cm.

As described above, the boehmite structure 1 has a high mechanical strength because a plurality of boehmite particles 2 are firmly bonded to each other. Preferably, the boehmite structure 1 thus has a flexural strength of 3 MPa or more measured in accordance with Japanese Industrial Standard JIS R1601 (Testing method for flexural strength (modulus of rupture) of fine ceramics at room temperature). Note that the flexural strength of the boehmite structure 1 is measured by three-point flexural strength testing method of JIS R 1601. When the flexural strength of the boehmite structure 1 is 3 MPa or more, the boehmite structure 1 is excellent in mechanical strength, and the machinability is enhanced. Thus, the boehmite structure 1 is easily usable, for example, in a building member requiring high mechanical strength and workability. Note that the flexural strength of the boehmite structure 1 is preferably 10 MPa or more, more preferably 50 MPa or more. The upper limit of the flexural strength of the boehmite structure 1 is not limited but may be, for example, 200 MPa.

In the boehmite structure 1, the plurality of boehmite particles 2 are not bonded by an organic binder made from an organic compound and are further not bonded by an inorganic binder made from an inorganic compound other than an oxide and a hydroxide of aluminum. Thus, in metallic elements included in the boehmite structure 1, the content ratio of the elements other than aluminum is preferably 5% by mass or less, more preferably 3% by mass or less, still more preferably 1% by mass or less. Since the boehmite structure 1 hardly includes impurities, such as sodium or calcium, properties inherent to boehmite are maintained.

As described above, the boehmite structure 1 according to the present embodiment includes the plurality of boehmite particles 2 where adjacent boehmite particles 2 are bonded to each other. The boehmite structure 1 has a porosity of 30% or less. In the boehmite structure 1, the plurality of boehmite particles 2 are bonded without using an organic binder and an inorganic binder made from an inorganic compound other than an oxide and a hydroxide of aluminum. Since the boehmite structure 1 is mainly made from a boehmite phase, the boehmite structure 1 is lightweight and has excellent chemical stability, and further it is possible to reduce the amount of impurities. Since the boehmite structure 1 has a porosity of 30% or less, the boehmite particles 2 are densely arranged, which enhances the mechanical strength of the boehmite structure 1. This provides the boehmite structure 1 with high machinability.

As illustrated in FIG. 1, the boehmite structure 1 according to the present embodiment is made a structure in which only boehmite particles 2 are bonded. However, as is described later, since the boehmite structure 1 is obtained by pressurizing the raw material while heating it to 50 to 300° C., for example, it is possible to add a member having low heat resistance to the boehmite structure 1. That is, the boehmite structure 1 may further include a substance other than the boehmite particles 2. In other words, the boehmite structure 1 may further include a substance made from a material other than the material making up the boehmite particles 2. Such a substance may be at least one of an organic substance or an inorganic substance. For example, the boehmite structure 1 may include resin particles or a dye in addition to the boehmite particles 2. The boehmite structure 1 may include particles made from metal particles or an inorganic compound, not limited to a member having low heat resistance.

[Boehmite Structure According to Second Embodiment]

Next, a boehmite structure according to a second embodiment is described in detail. The same components as those in the first embodiment are denoted by the same reference numerals, and redundant description is omitted.

The boehmite structure according to the present embodiment includes a plurality of boehmite particles 2 where adjacent boehmite particles 2 are bonded to each other, as in the first embodiment. The porosity of the boehmite structure is 30% or less. Thus, the boehmite structure according to the present embodiment is also lightweight and excellent in chemical stability, and has reduced amount of impurities.

The boehmite structure according to the present embodiment is characterized by having the translucency of visible light as a result of increasing the density. Specifically, in the boehmite structure, the average value of the total light transmittance in the wavelength range of 380 nm to 700 nm at a thickness of 0.5 mm to 1 mm is preferably 10% or more, more preferably 15% or more, still more preferably 20% or more. Increasing the density of the boehmite structure prevents the visible light from scattering, thereby improving the light transmittance.

Here, to increase the density of the boehmite structure and improve the translucency, it is preferable to reduce the pore diameter of the pores 3 and to further miniaturize grain boundaries of the plurality of boehmite particles 2. The reduction of the pore diameter of the pores 3 and miniaturization of the grain boundaries of the boehmite particles 2 reduce interfaces between the boehmite particles 2 and the pores 3 and interfaces among adjacent boehmite particles 2. As a result, scattering of light at the interfaces is reduced, which enhances the translucency of the boehmite structure. Thus, preferably, the boehmite structure has the pores 3, and the size of the pores 3 is 1 µm or less. Having the size of the pores 3 present in the boehmite structure being 1 µm or less reduces the interfaces between the boehmite particles 2 and the pores 3, thereby reducing the scattering of transmitted light and enhancing the translucency.

To increase the density of the boehmite structure and improve the translucency, preferably, the denseness of the boehmite structure is enhanced. Thus, preferably, the boehmite structure has a porosity of 5% or less. When the porosity of the boehmite structure is 5% or less, the number of pores 3 is reduced, and the interfaces between the boehmite particles 2 and the pores 3 are also reduced. Thus, the scattering of the transmitted light at interfaces is reduced, which enhances the translucency of the boehmite structure. Note that to further increase the density of the boehmite structure, the porosity of the boehmite structure is more preferably 3% or less, still more preferably 1% or less.

As described above, the boehmite structure according to the present embodiment has the plurality of boehmite particles 2 bonded to each other and further has the translucency of visible light. Thus, for example, by adding a dye, a structure having an excellent design property is obtained.

[Method of Producing Boehmite Structure According to First Embodiment]

Next, a method of producing the boehmite structure 1 according to the first embodiment is described. The boehmite structure 1 is produced by mixing hydraulic alumina and a solvent including water, and heating the mixture under pressure. The hydraulic alumina is a hydrate formed by heat treatment of aluminum hydroxide and includes ρ-alumina. Such hydraulic alumina has a property of bonding and curing by a hydration reaction. Thus, by using the pressure heating method, the hydration reaction of the hydraulic alumina progresses to bond particles of the hydraulic alumina to each other, and the crystalline structure changes to that of boehmite, so that the boehmite structure 1 is formed.

Specifically, first, a mixture is prepared by mixing a powder of hydraulic alumina with a solvent including water. Preferably, the solvent including water is pure water or ion exchange water. However, the solvent including water may include an acidic substance or an alkaline substance other than water. The solvent including water is only required to be made mainly from water and may include, for example, an organic solvent (for example, alcohol).

Preferably, the amount of the solvent added to the hydraulic alumina is an amount sufficient to proceed the hydration reaction of the hydraulic alumina. The amount of the solvent added is preferably 20 to 200% by mass, more preferably 50 to 150% by mass to the hydraulic alumina.

Next, the mixture formed by mixing the hydraulic alumina with the solvent including water is filled in a mold. After filling the mixture in the mold, the mold may be heated as necessary. By applying pressure to the mixture inside the mold, the inside of the mold becomes a high pressure state. At this time, the hydraulic alumina becomes highly filled, and the particles of the hydraulic alumina are bonded to each other, resulting in a high density. Specifically, by adding water to the hydraulic alumina, the hydraulic alumina undergoes a hydration reaction to form boehmite and aluminum hydroxide on the surface of the hydraulic alumina particles. By heating and pressurizing the mixture in the mold, the generated boehmite and aluminum hydroxide diffuse mutually among the adjacent hydraulic alumina particles, and the hydraulic alumina particles are gradually bonded to each other. Then, the dehydration reaction proceeds by heating, and the crystalline structure is changed from aluminum hydroxide to boehmite. It is supposed that the hydration reaction of the hydraulic alumina, the counter diffusion among the hydraulic alumina particles, and the dehydration reaction proceed almost simultaneously.

The molded body is then taken out from the mold to obtain the boehmite structure 1 in which the plurality of boehmite particles 2 are bonded to each other via at least one of the oxide or the hydroxide of aluminum.

Note that the condition for heating and pressurizing the mixture formed by mixing the hydraulic alumina with the solvent including water is not limited as long as the reaction between the hydraulic alumina and the solvent progresses. For example, preferably, the mixture formed by mixing the hydraulic alumina and the solvent including water is pressurized at a pressure of 10 to 600 MPa while being heated to 50 to 300° C. Note that the temperature at which the mixture of the hydraulic alumina and the solvent including water is heated is more preferably 80 to 250° C., still more preferably 100 to 200° C. The pressure at which the mixture formed by mixing the hydraulic alumina and the solvent including water is pressurized is more preferably 50 to 600 MPa, still more preferably 200 to 600 MPa.

As a method of forming the boehmite structure, a method of pressing only the powder of boehmite is considered. However, even if the powder of boehmite is put into a mold and pressurized at normal temperature, the particles of boehmite are difficult to react with each other, and it is difficult to firmly bond the particles together. Thus, the obtained compact has many pores and thus has insufficient mechanical strength.

As a method of producing an inorganic member made from ceramics, a sintering method has been known. The sintering method is a method of obtaining a sintered body by heating an aggregate of solid powders made from an inorganic substance at a temperature lower than the melting point. Thus, as a method of forming the boehmite structure, a method of pressing only the powder of boehmite to form a compact and then calcining it at 500° C. is also considered. However, when the compact is calcined at 500° C., the dehydration reaction of boehmite progresses, and the crystalline structure changes from boehmite to γ-alumina. Since the specific gravity of γ-alumina is about 3.98, a lightweight structure is not obtained. Even if the compact of boehmite powder is heated at about 500° C., the boehmite particles are difficult to sinter with each other, so that the obtained structure has many pores and has insufficient mechanical strength.

A further method of forming the boehmite structure is considered to include forming a compact by pressing only the powder of boehmite and then calcining it at 1400° C. When the compact of boehmite powder is calcined at 1400° C., the boehmite powders are sintered to form a structure. However, when the compact of boehmite is calcined at 1400° C., the dehydration reaction of boehmite progresses, and the crystalline structure changes from boehmite to α-alumina. Thus, it is not possible to obtain a structure that is dense, lightweight, and excellent in strength because densification is prevented by the occurrence of pores due to dehydration, and further the specific gravity of α-alumina is about 3.98. In contrast, in the producing method according to the present embodiment, a mixture formed by mixing hydraulic alumina and a solvent including water is pressurized while being heated, which provides a structure that mainly has a boehmite phase, and is dense, lightweight and excellent in strength.

As described above, the method of producing the boehmite structure 1 according to the present embodiment includes a step of obtaining a mixture by mixing hydraulic alumina with a solvent including water, and a step of pressurizing and heating the mixture. Preferably, the heating and pressurizing condition of the mixture is a temperature of 50 to 300° C., and a pressure of 10 to 600 MPa. In the producing method according to the present embodiment, since the boehmite structure 1 is formed under such a low temperature condition, the obtained structure is mainly made from a boehmite phase. Thus, the boehmite structure 1 that is lightweight, excellent in chemical stability, and has a reduced amount of impurities is obtained by a simple method.

[Method of Producing Boehmite Structure According to Second Embodiment]

Next, a method of producing a boehmite structure according to the second embodiment is described. The boehmite structure according to the second embodiment is produced by mixing hydraulic alumina and a solvent including water, pressurizing and heating the mixture, as in the first embodiment. Specifically, the method of producing a boehmite structure includes a step of mixing hydraulic alumina with a solvent including water to obtain a mixture, and a step of pressurizing and heating the mixture at a temperature of 50 to 300° C. and a pressure of 10 to 600 MPa.

However, in the producing method according to the present embodiment, the particle diameter of hydraulic alumina as a raw material is reduced. Specifically, the average particle diameter $D_{50}$ of the hydraulic alumina as a raw material is 5 μm or less. By reducing the average particle diameter $D_{50}$ of the hydraulic alumina, when a mixture of the hydraulic alumina and a solvent is pressurized while being heated, the particles are easily packed densely, and the particles are easily bonded to each other. As a result, the porosity is reduced, and a high-density boehmite structure is obtained. Note that the average particle diameter $D_{50}$ of the hydraulic alumina is determined by a laser diffraction/scattering method.

As described above, the hydraulic alumina having ρ-alumina as the main phase is prepared by heat treatment of gibbsite (aluminum hydroxide). Specifically, the hydraulic alumina is prepared by heating gibbsite at 300 to 600° C. under normal pressure or reduced pressure. Thus, for example, by heating gibbsite having an average particle diameter $D_{50}$ of 5 μm or less at 350 to 600° C. under normal pressure or reduced pressure, the hydraulic alumina having an average particle diameter $D_{50}$ of 5 μm or less is obtained. Note that the average particle diameter $D_{50}$ of the hydraulic alumina used as the raw material is more preferably 3 μm or less, still more preferably 1 μm or less.

[Member with Boehmite Structure]

Next, a member including the boehmite structure 1 is described. As described above, it is possible to form the boehmite structure 1 into a plate-like shape having a large thickness, which is also lightweight and having excellent chemical stability. The boehmite structure 1 has a high mechanical strength and can be cut and also surface-processed in the same manner as a general ceramic member. Thus, the boehmite structure 1 is suitably usable as a building member. The building member is not limited but examples thereof include an exterior wall material (siding), and a roof material. Examples of the building member include materials for roads and materials for outer grooves.

The boehmite structure 1 is also usable as a substrate for a thin film circuit, a substrate for a sensor member, a substrate for a semiconductor process, and a ceramic member of a semiconductor manufacturing apparatus.

EXAMPLES

The boehmite structure according to the present embodiments is described in more detail below with reference to examples, but the present embodiments are not limited thereto.

Example 1

(Preparation of Test Sample 1)

Figure 2:
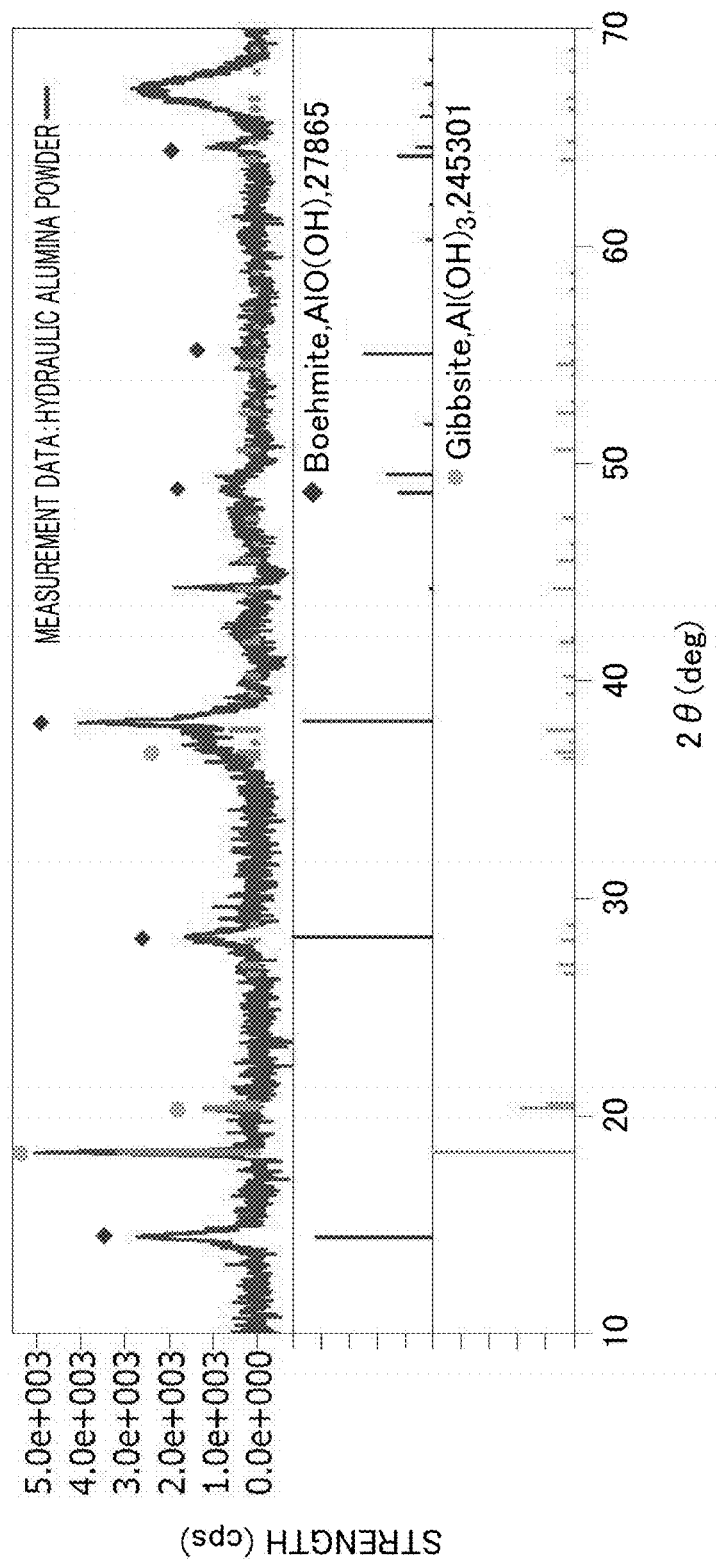
FIG. 2 is a graph illustrating an X-ray diffraction pattern of hydraulic alumina used in example 1 and patterns of boehmite (AlOOH) and gibbsite (Al(OH)$_3$) registered in ICSD.

First, as hydraulic alumina, hydraulic alumina BK-112 manufactured by SUMITOMO CHEMICAL COMPANY, LIMITED was prepared. Note that the hydraulic alumina has a central particle diameter of 16 μm. FIG. 2 illustrates an X-ray diffraction pattern of power of this hydraulic alumina, and patterns of boehmite (AlOOH) and gibbsite (Al(OH)$_3$) registered in ICSD. As illustrated in FIG. 2, it is seen that the hydraulic alumina is a mixture of boehmite and gibbsite (aluminum hydroxide). Although not illustrated in FIG. 2, the hydraulic alumina also includes ρ-alumina.

Then, after the ion exchange water was weighed to be 80% by mass to the hydraulic alumina, the hydraulic alumina and the ion exchange water were mixed by using an agate mortar and pestle to obtain a mixture. Then, the mixture obtained was put in a cylindrical molding die (Φ10) having an internal space. The mixture was then heated and pressurized under a condition of 400 MPa, 180° C., and 20 minutes to obtain a test sample 1 of the present example.

(Porosity Measurement)

Figure 3:
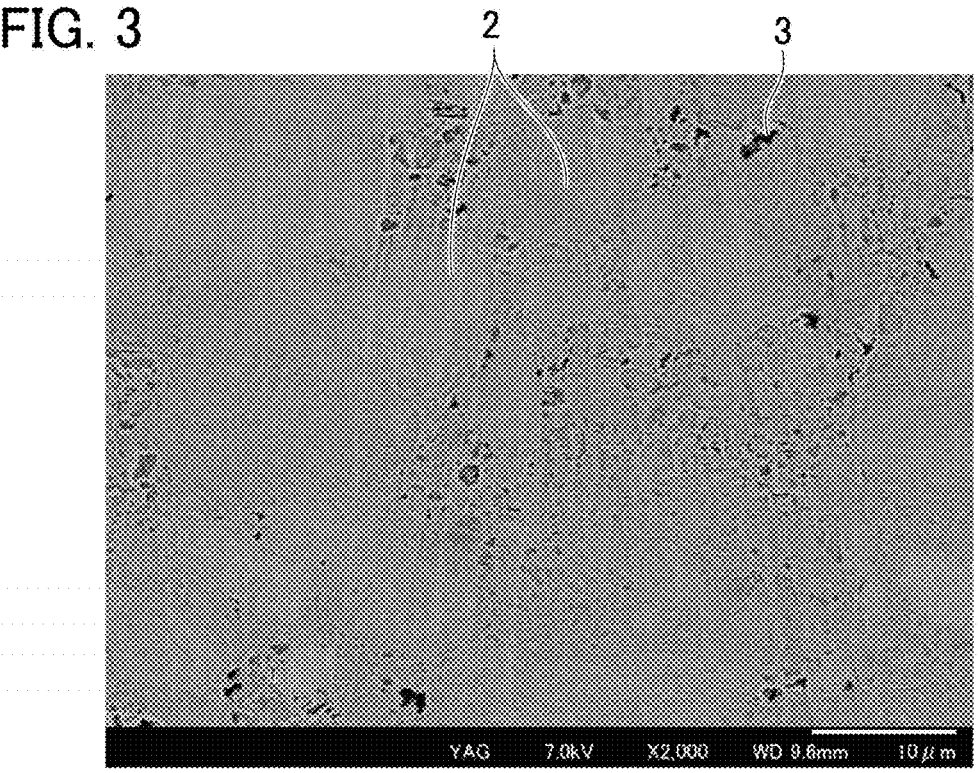
FIG. 3 is a diagram illustrating a reflection electron image at position 1 in test sample 1 of example 1.
Figure 5:
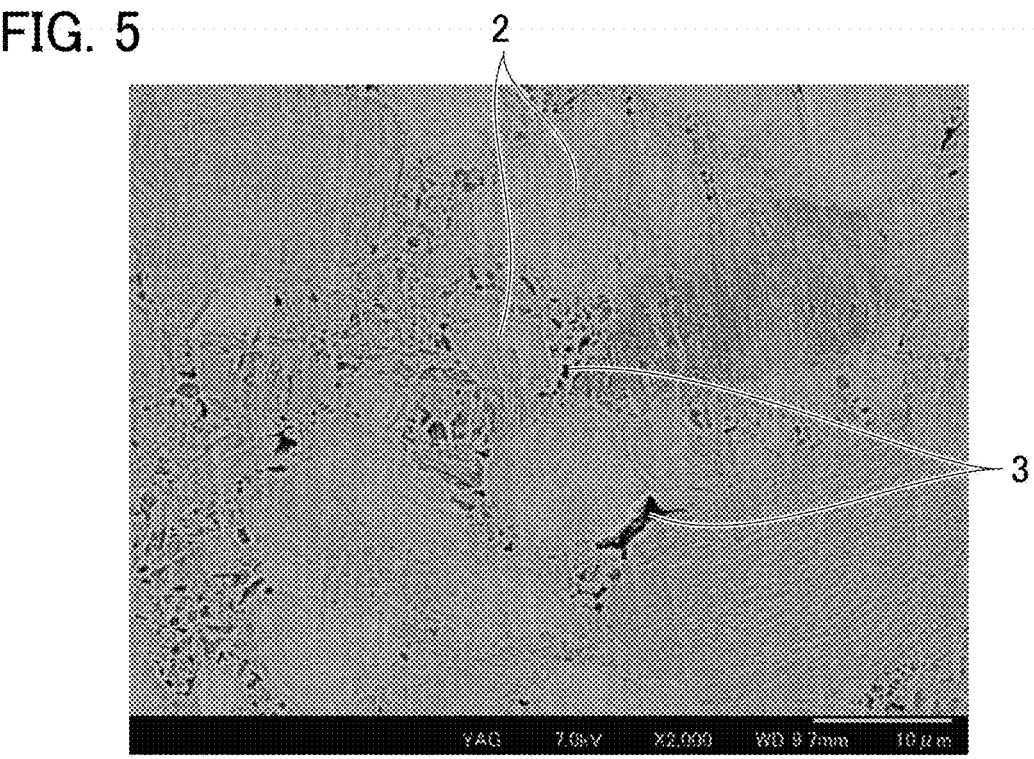
FIG. 5 is a diagram illustrating a reflection electron image at position 2 in test sample 1 of example 1.
Figure 7:
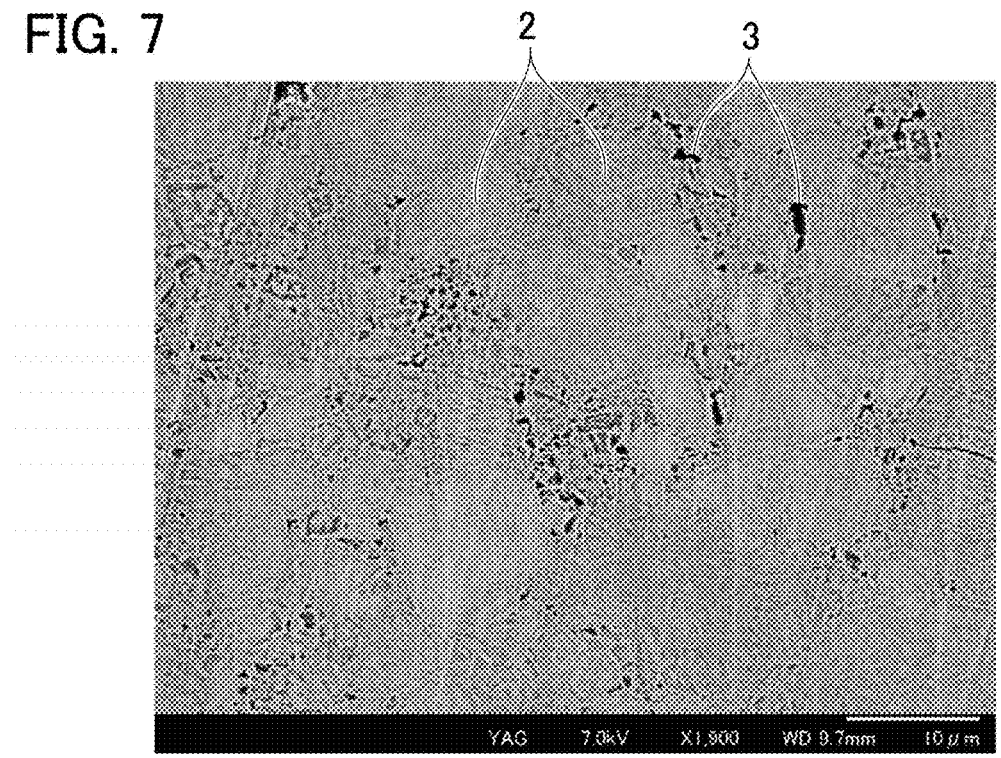
FIG. 7 is a diagram illustrating a reflection electron image at position 3 in test sample 1 of example 1.

First, a cross section polisher processing (CP processing) was applied to a cross section of test sample 1 that is cylindrical. Next, using a scanning electron microscope (SEM), a reflection electron image was observed at a magnification of 2,000 on the cross section of test sample 1. The reflection electron images obtained by observing three points (positions 1 to 3) in the cross section of test sample 1 are illustrated in FIGS. 3, 5 and 7. In the observed reflection electron images, white particles are boehmite particles 2 and black portions are pores 3.

Figure 4:
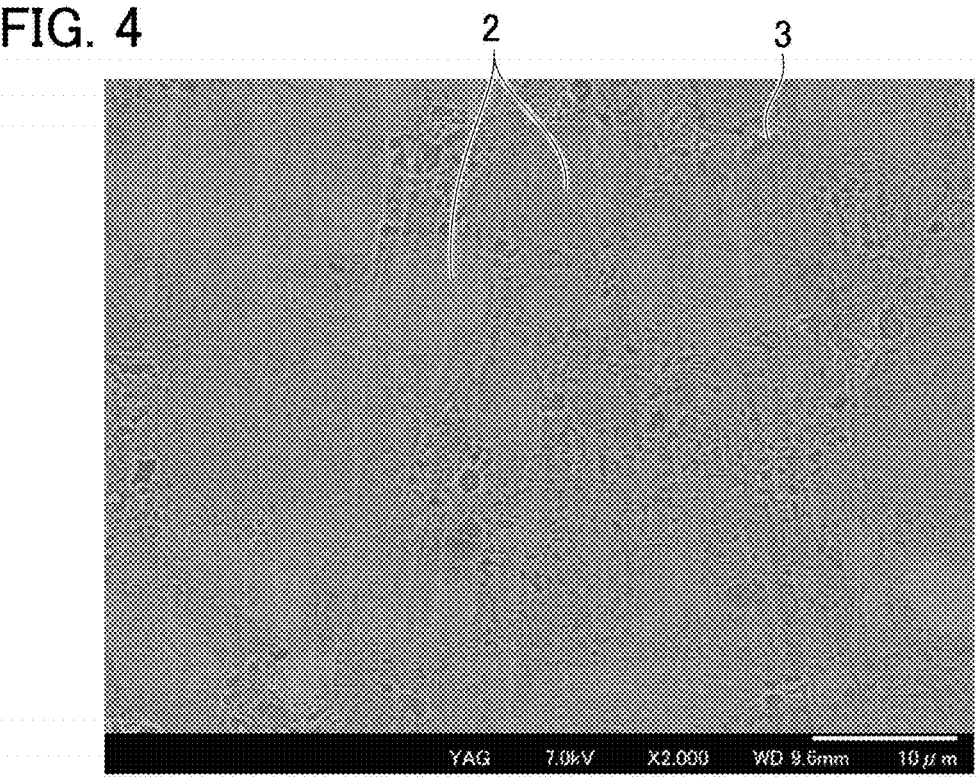
FIG. 4 a diagram illustrating binarized data of the reflection electron image at position 1 in test sample 1 of example 1.
Figure 6:
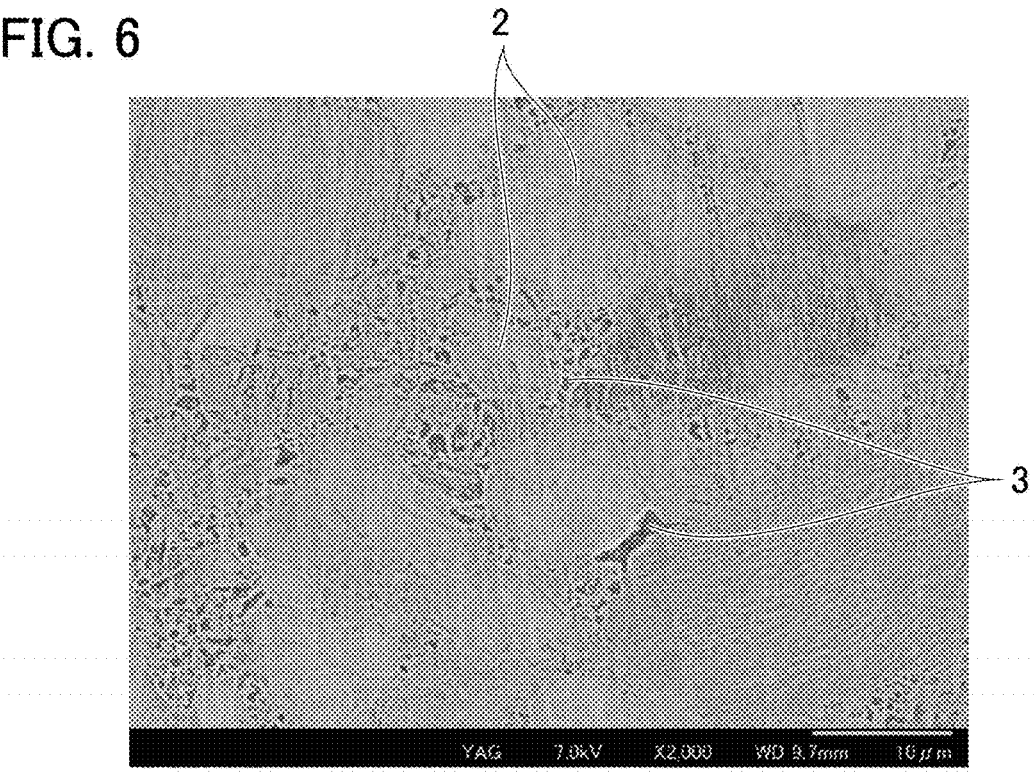
FIG. 6 is a diagram illustrating binarized data of the reflection electron image at position 2 in test sample 1 of example 1.
Figure 8:
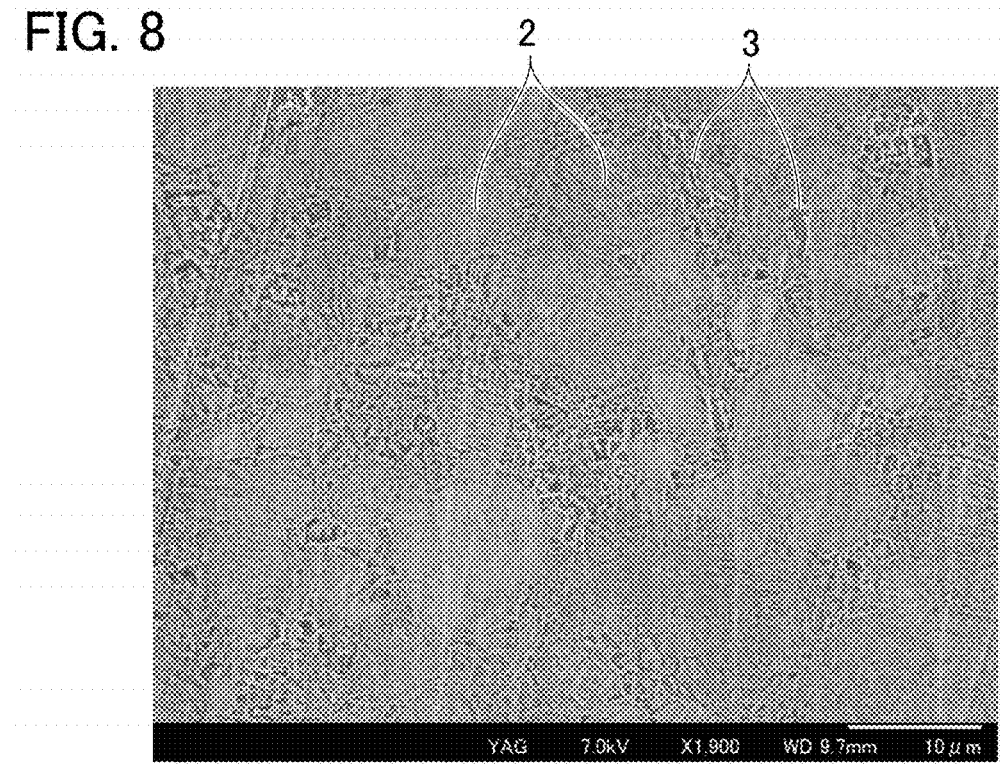
FIG. 8 is a diagram illustrating binarized data of the reflection electron image at position 3 in test sample 1 of example 1.

Next, the SEM images of the three fields were binarized to clarify the pore portions. The binarized images of the reflection electron images of FIGS. 3, 5 and 7 are illustrated in FIGS. 4, 6 and 8. Then, the area percentage of the pore portion was calculated from the binarized image, and the average value was used as the porosity. Specifically, from FIG. 4, the area percentage of the pore portion at position 1 was 1.5%. From FIG. 6, the area percentage of the pore portion at position 2 was 0.9%. From FIG. 8, the area percentage of the pore portion at position 3 was 2.0%. Thus, the porosity of test sample 1 was 1.5%, which is the average value of the area percentage of the pore portion at positions 1 to 3.

(Flexural Strength Measurement)

Figure 9:
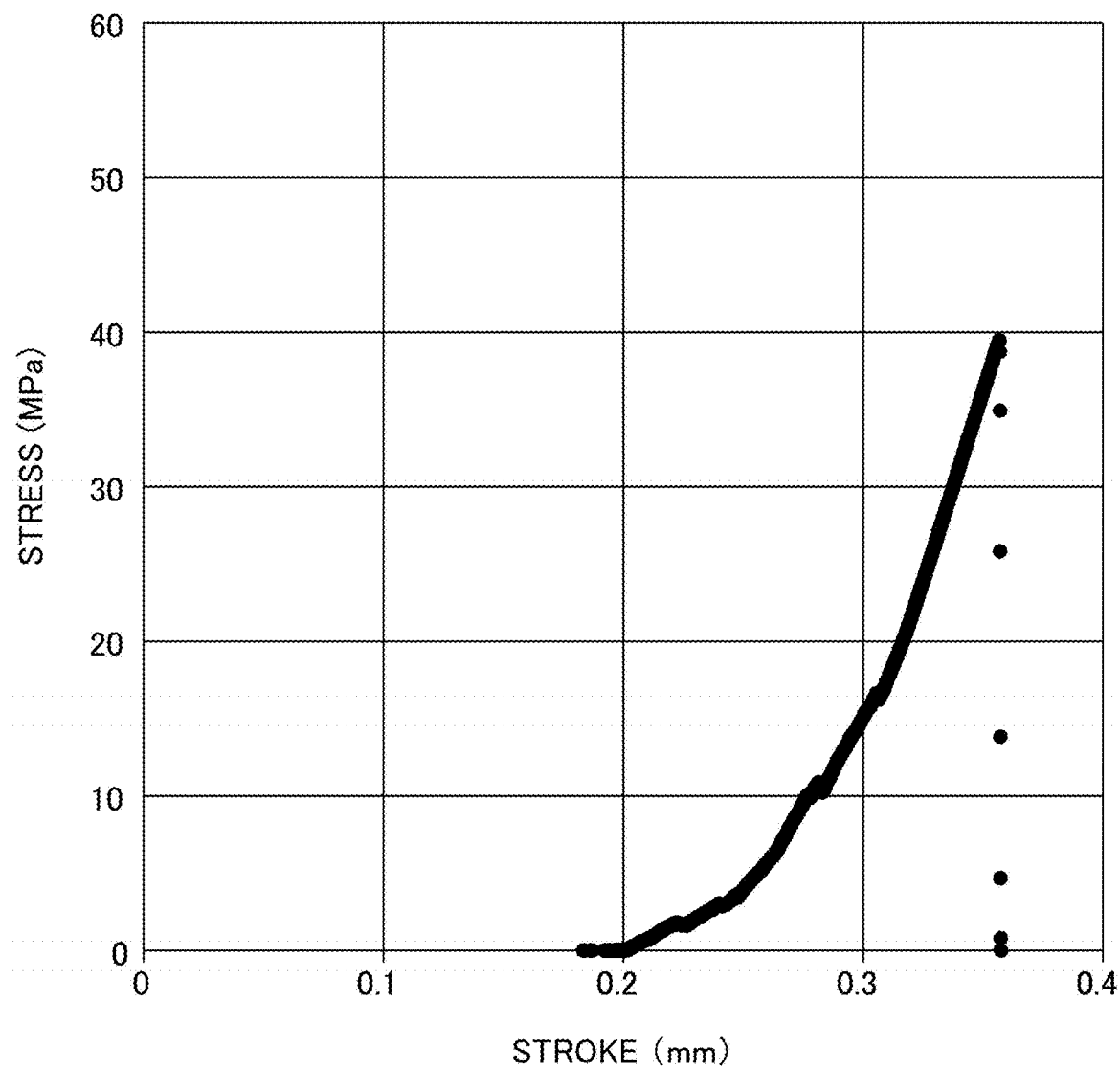
FIG. 9 is a graph illustrating a relationship between stress and stroke when flexural strength of test sample 1 of example 1 is measured in accordance with JIS R1601.

The flexural strength of test sample 1 was measured in accordance with JIS R1601. The graph of FIG. 9 illustrates a relationship between the stress of test sample 1 and the stroke of the testing machine. From FIG. 9, since the maximum value of stress of test sample 1 was 39.4 MPa, the flexural strength of test sample 1 was 39.4 MPa.

Example 2

After the ion exchange water was weighed to be 80% by mass to the same hydraulic alumina as in example 1, the hydraulic alumina and the ion exchange water were mixed using an agate mortar and pestle to obtain a mixture.

Next, the mixture obtained was dried without being pressurized at the normal temperature to obtain test sample 2 of a comparative example. Further, the above-described mixture was put into a cylindrical molding die (Φ10) having an internal space, and the mixture was heated and pressurized under a condition of 50 MPa, 180° C., and 30 minutes to obtain a test sample 3 of example. Further, the above-described mixture was put into a cylindrical molding die (Φ10) having an inner space, and the mixture was heated and pressurized under a condition of 200 MPa, 180° C., and 30 minutes to obtain test sample 4 of example.

Figure 10:
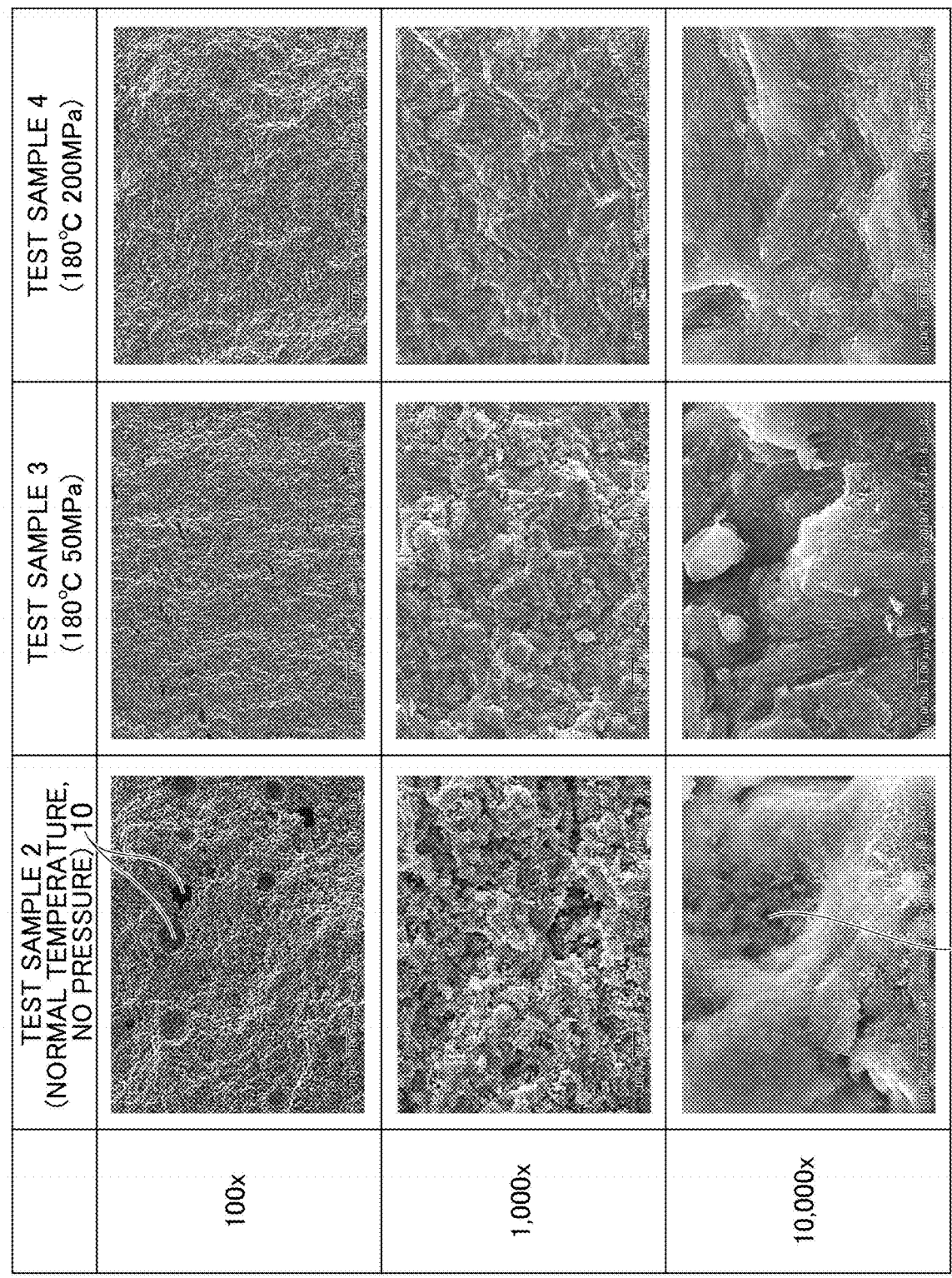
FIG. 10 is a photomicrograph of results of observing cross sections of a test sample 2, test sample 3, and test sample 4, where a mixture of hydraulic alumina and water was molded at normal temperature and under no pressure, 180° C. and 50 MPa, and 180° C. and 200 MPa, respectively, in example 2.

Then, test samples 2 to 4 were each pulverized, and reflection electron images were observed using a scanning electron microscope (SEM) at magnifications of 100, 1000, and 10,000. FIG. 10 illustrates reflection electron images at magnifications of 100, 1000, and 10,000 in test samples 2 to 4 together.

As illustrated in FIG. 10, it is seen that a large number of macro-pores 10 having a pore diameter of about 100 μm are formed in test sample 2 formed at normal temperature without pressurization. Further, it is seen that a large number of macro-pores 11 having a pore diameter of about several μm, and nano-pores having a pore diameter of several tens to several hundreds nm are formed in test sample 2. Thus, when the mixture of hydraulic alumina and water is not pressurized and heated, the structure obtained has a porosity over at least 30%, resulting in insufficient strength.

In contrast, test sample 3 molded under a condition of 50 MPa and 180° C., and test sample 4 molded under a condition of 200 MPa and 180° C. have no macro-pores 10 having a pore diameter of about 100 μm confirmed. Further, test sample 4 has no macro-pores 11 having a pore diameter of about several μm confirmed. Therefore, it is seen that both of test samples 3 and 4 formed by the pressure heating method have porosity of 30% or less and have high strength.

Example 3

(Preparation of Test Sample 5)

After the ion exchange water was weighed to be 80% by mass to the same hydraulic alumina as in example 1, the hydraulic alumina and the ion exchange water were mixed using an agate mortar and pestle to obtain a mixture. The mixture obtained was then put into a cylindrical molding die (Φ10) having an internal space. Then, the mixture was heated and pressurized under a condition of 50 MPa, 120° C., and 20 minutes to obtain test sample 5 of the present example.

(Preparation of Test Sample 6)

After the ion exchange water was weighed to be 20% by mass to the same hydraulic alumina as in example 1, the hydraulic alumina and the ion exchange water were mixed using an agate mortar and pestle to obtain a mixture. The mixture obtained was then put into a cylindrical molding die (Φ10) having an internal space. The mixture was then heated and pressurized under a condition of 50 MPa, 120° C., and 20 minutes to obtain test sample 6 of the present example.

(X-Ray Diffraction Measurement)

Figure 11:
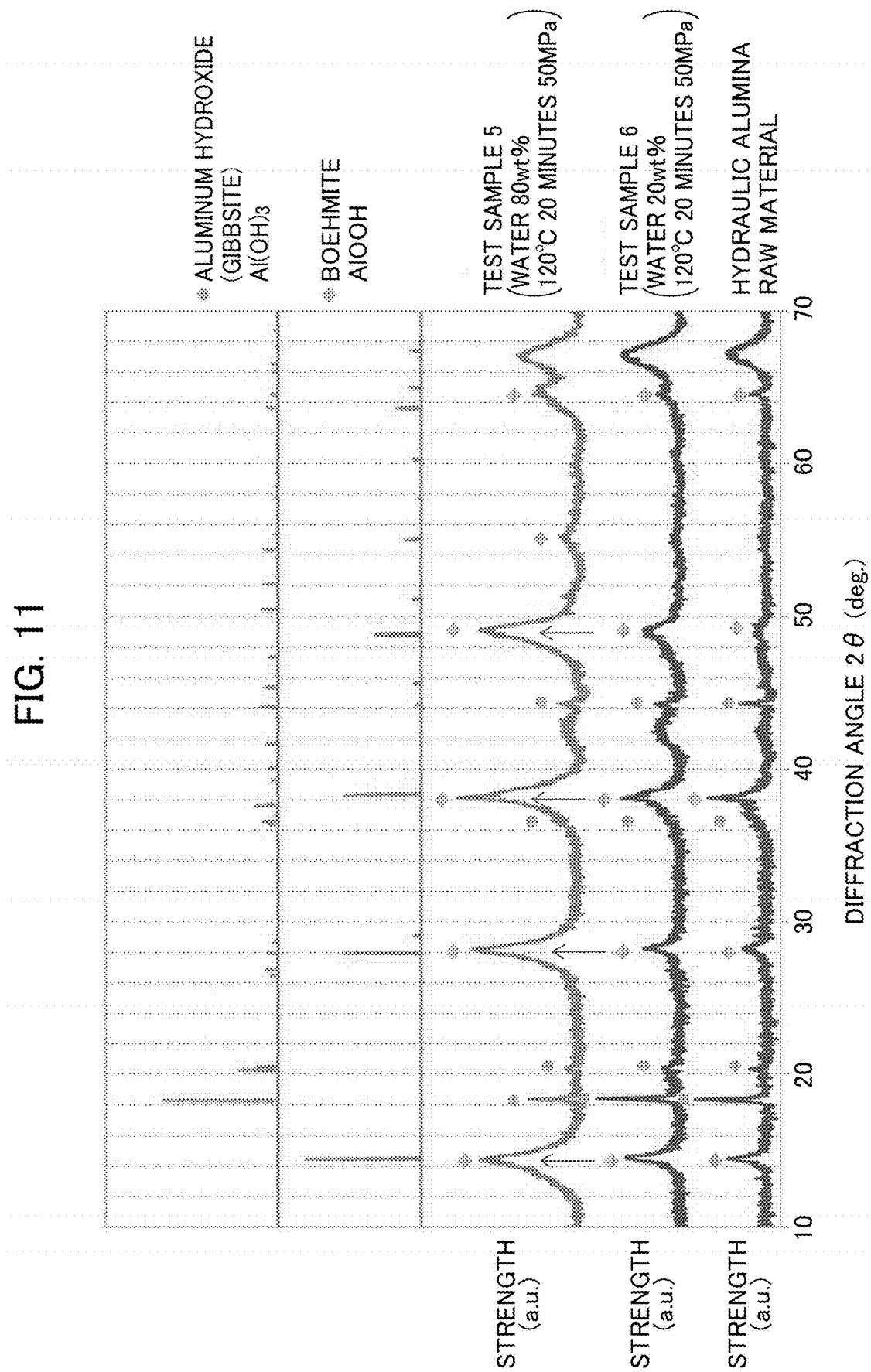
FIG. 11 is a graph illustrating X-ray diffraction patterns of test samples 5 and 6 obtained by varying the amount of water added to hydraulic alumina in example 3, and X-ray diffraction patterns of boehmite and gibbsite registered in ICSD.

X-ray diffraction patterns of test samples 5 and 6 obtained as described above were measured using an X-ray diffraction apparatus. FIG. 11 illustrates X-ray diffraction patterns of test samples 5 and 6 and an X-ray diffraction pattern of the hydraulic alumina powder as a raw material. FIG. 11 also illustrates X-ray diffraction patterns of boehmite and gibbsite registered in ICSD.

As is seen from FIG. 11, in test sample 5 in which 80% by mass of ion exchange water is added to hydraulic alumina, the presence percentage of boehmite is increased in comparison with test sample 6 in which 20% by mass of ion exchange water is added. That is, when a mixture of hydraulic alumina and ion exchange water is prepared, increasing the amount of ion exchange water added, and performing heating and pressurizing progress the crystalline structure change from aluminum hydroxide to boehmite. Since boehmite has higher chemical resistance than aluminum hydroxide, the boehmite structure having excellent chemical resistance is obtained by increasing the presence percentage of boehmite.

Example 4

(Preparation of Test Sample 7)

After the ion exchange water was weighed to be 80% by mass to the same hydraulic alumina as in example 1, the hydraulic alumina and the ion exchange water were mixed using an agate mortar and pestle to obtain a mixture. The mixture obtained was then heated and pressurized under a condition of 400 MPa, 180° C., and 20 minutes to obtain a boehmite structure of the present example. Further, the boehmite structure of the present example was heated at 400° C. for 1 hour in air using an electric furnace, and test sample 7 of the present example is obtained.

(X-Ray Diffraction Measurement)

Figure 12:
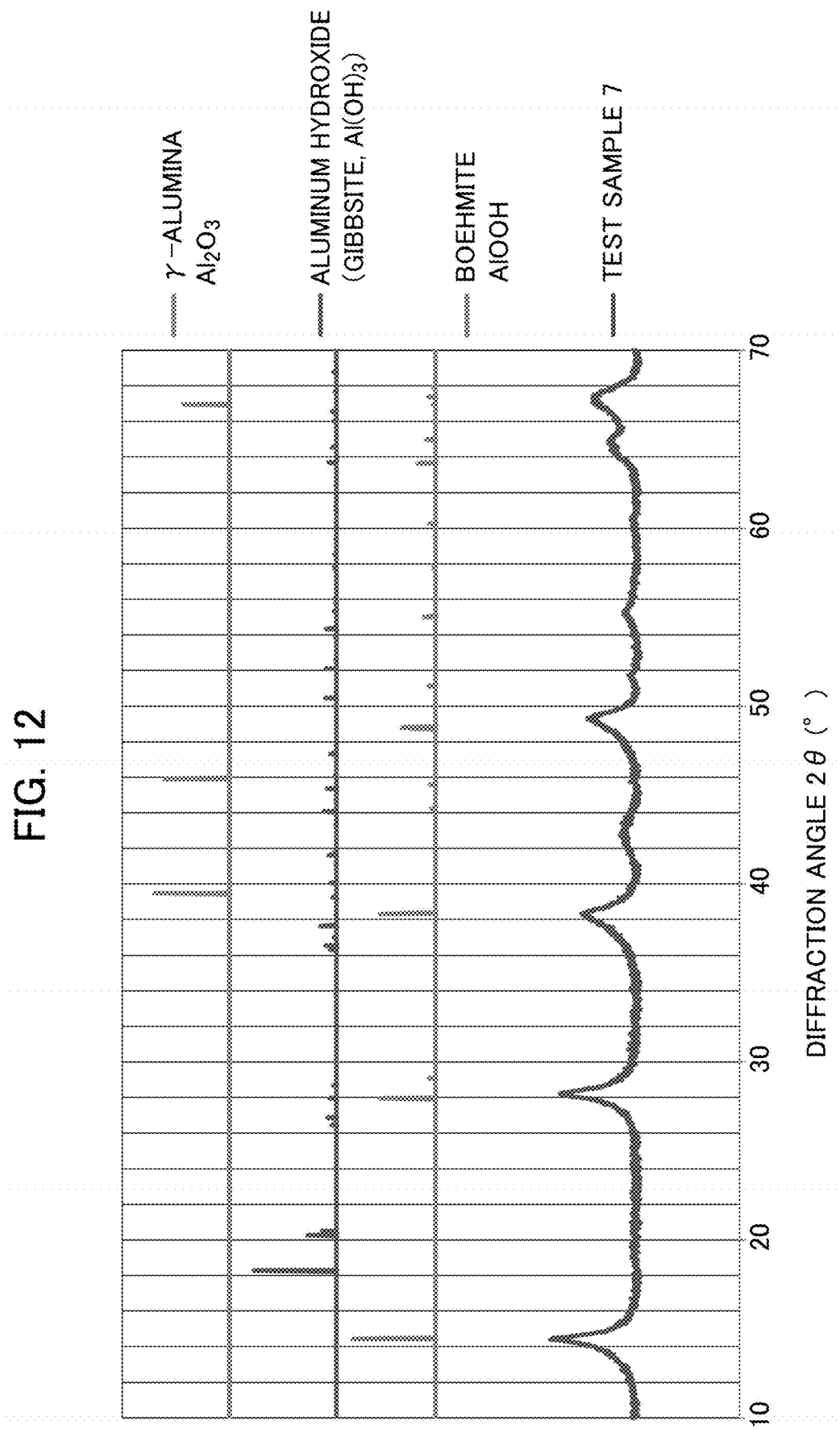
FIG. 12 is a graph illustrating an X-ray diffraction pattern of test sample 7 obtained by calcining a boehmite structure at 400° C. for 1 hour in example 4, and X-ray diffraction patterns of γ-alumina, gibbsite, and boehmite registered in ICSD.

The X-ray diffraction pattern of test sample 7 obtained as described above was measured using an X-ray diffraction apparatus. FIG. 12 illustrates an X-ray diffraction pattern of test sample 7 and X-ray diffraction patterns of γ-alumina, gibbsite (aluminum hydroxide), and boehmite registered in ICSD. The X-ray diffraction pattern of the boehmite structure before heating at 400° C. for 1 hour was measured and Rietveld analysis was performed to obtain the ratio of each phase.

As a result of Rietveld analysis, it was found that the boehmite structure before heating at 400° C. for 1 hour had 65% by mass of boehmite phase, 25% by mass of gibbsite phase (aluminum hydroxide phase), and 10% by mass of γ-alumina phase. As described above, aluminum hydroxide reacts with acids and alkalis, so that if the aluminum hydroxide phase remains in the boehmite structure, chemical resistance may be reduced. However, as illustrated in FIG. 12, when the boehmite structure in which the gibbsite phase exists is heated, a dehydration reaction occurs in the gibbsite phase, and the crystalline structure is changed from the gibbsite phase to the boehmite phase. Therefore, it is found that by heating the boehmite structure at a temperature at which a dehydration reaction occurs, the gibbsite phase disappears, and the boehmite structure excellent in chemical resistance is obtained.

Example 5

(Preparation of Test Sample 8)

First, aluminum hydroxide (manufactured by SHOKO CO., LTD. purity 99.6%) having an average particle diameter $D_{50}$ of about 0.8 μm was prepared. Next, the aluminum hydroxide was heated at 350° C. for 1 hour using an electric furnace at a temperature rising rate and a cooling rate of 300° C./h. As a result, a hydraulic alumina powder having an average particle diameter $D_{50}$ of about 0.8 μm was obtained.

FIG. 13 illustrates scanning electron micrographs of the obtained hydraulic alumina. As illustrated in FIG. 13, it was confirmed that the obtained hydraulic alumina hardly coarsened from the raw material aluminum hydroxide particles and maintained a fine state. As a result of measuring the X-ray diffraction pattern of the obtained hydraulic alumina using an X-ray diffraction apparatus, both the peak derived from boehmite and the peak derived from ρ-alumina were confirmed.

Next, 0.25 g of the above-described hydraulic alumina was put into a cylindrical molding die (Φ10) having an internal space. Further, 200 μL of the ion exchange water was added to the inside of the molding die and mixed using a plastic spatula. Then, the mixture including the ion exchange water was heated and pressurized under a condition of 400 MPa, 200° C., and 30 minutes to obtain test sample 8 of the present example. Test sample 8 of the present example had a thickness of about 0.75 mm and a high hardness like a sintered body.

(Total Light Transmittance Measurement)

Figure 14:
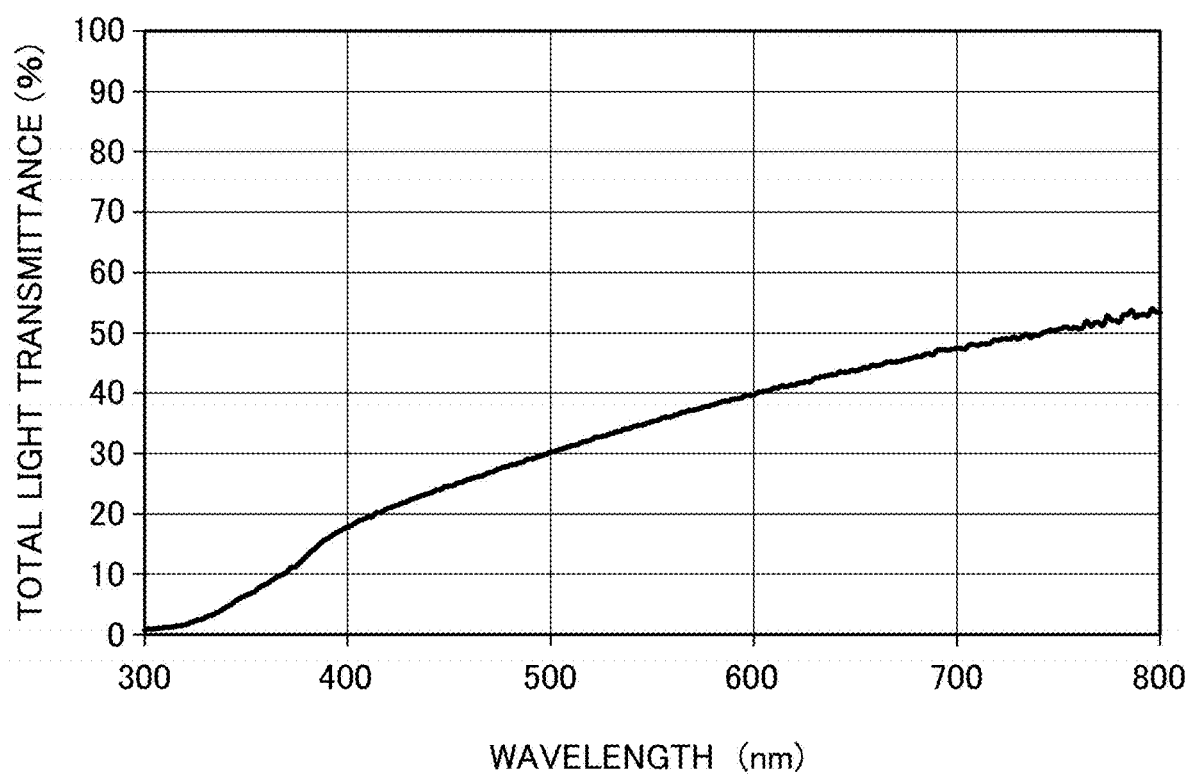
FIG. 14 is a graph illustrating a relationship between total light transmittance and wavelength in test sample 8 of example 5.

The total light transmittance of test sample 8 was measured using an ultraviolet visible near infrared spectrophotometer UV-2600 manufactured by SHIMADZU CORPORATION. The measurement results are illustrated in FIG. 14. As illustrated in FIG. 14, although the light transmittance of test sample 8 at a wavelength of about 380 nm was about 15%, the light transmittance tends to increase as the wavelength becomes longer. In the vicinity of the wavelength of 700 nm, the light transmittance exceeded 45%. Thus, it is seen from FIG. 14 that the average value of the total light transmittance of test sample 8 in the wavelength range of 380 nm to 700 nm is 20% or more.

(X-Ray Diffraction Measurement)

Figure 15:
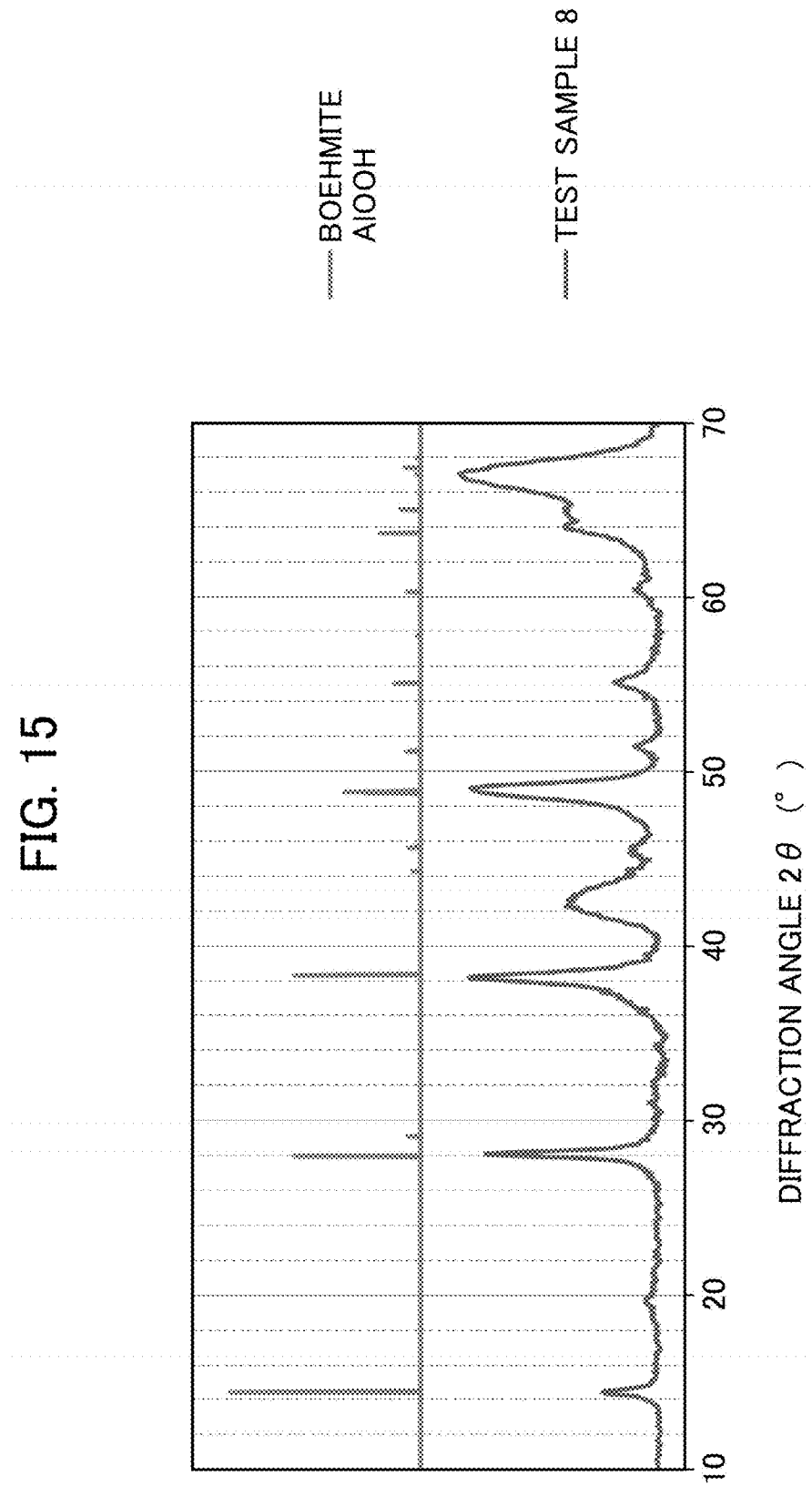
FIG. 15 is a graph illustrating an X-ray diffraction pattern of test sample 8 of example 5 and an X-ray diffraction pattern of boehmite registered in ICSD.

The X-ray diffraction pattern of test sample 8 obtained as described above was measured using an X-ray diffraction apparatus. FIG. 15 illustrates the X-ray diffraction pattern of test sample 8 and that of boehmite registered in ICSD. From FIG. 15, it is seen that test sample 8 is a structure mainly made from boehmite because the peak of boehmite is confirmed.

Example 6

(Preparation of Test Sample 9)

Test sample 9 of the present example was obtained by the same producing method as in example 5. Test sample 9 of the present example also had a high hardness like a sintered body.

(Porosity Measurement)

Figure 16:
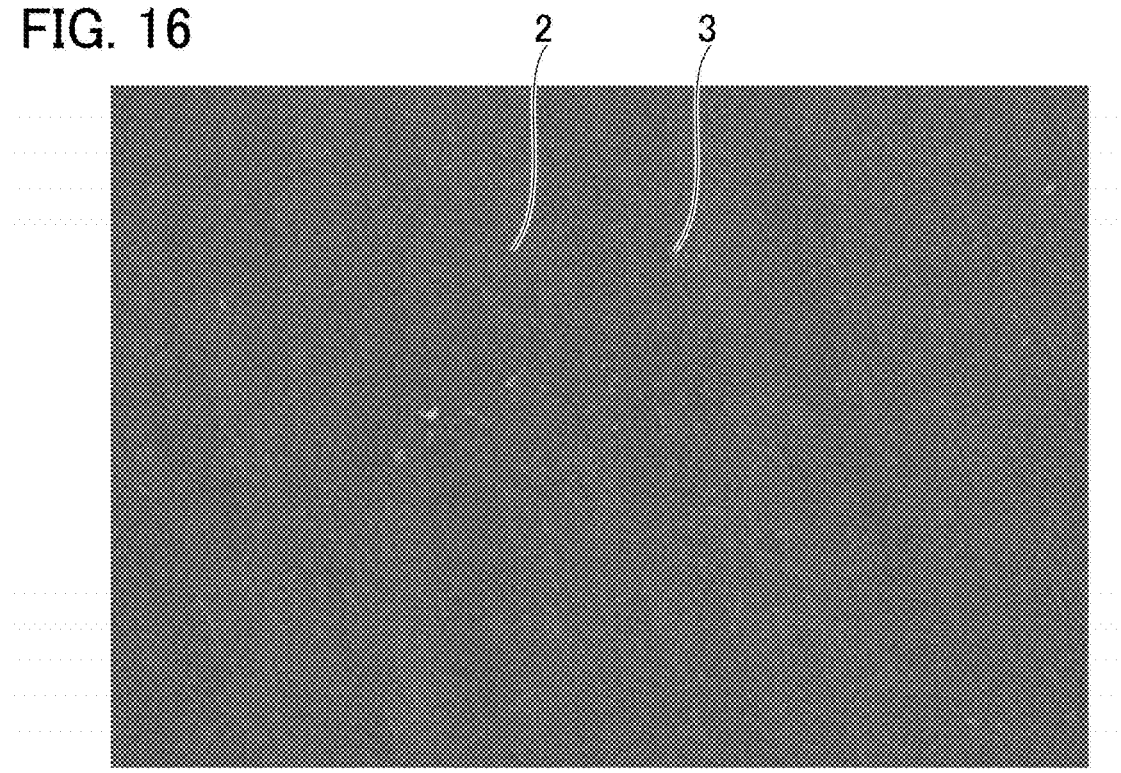
FIG. 16 is a diagram illustrating a secondary electron image at position 1 in test sample 9 of example 6.
Figure 18:
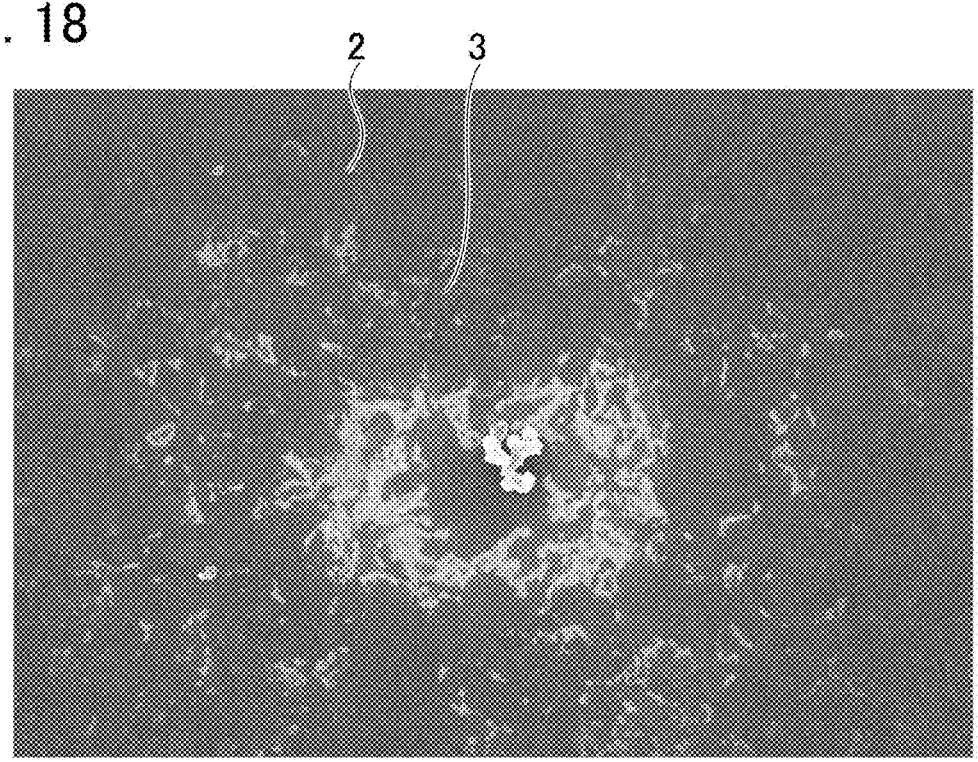
FIG. 18 is a diagram illustrating a secondary electron image at position 2 in test sample 9 of example 6.
Figure 20:
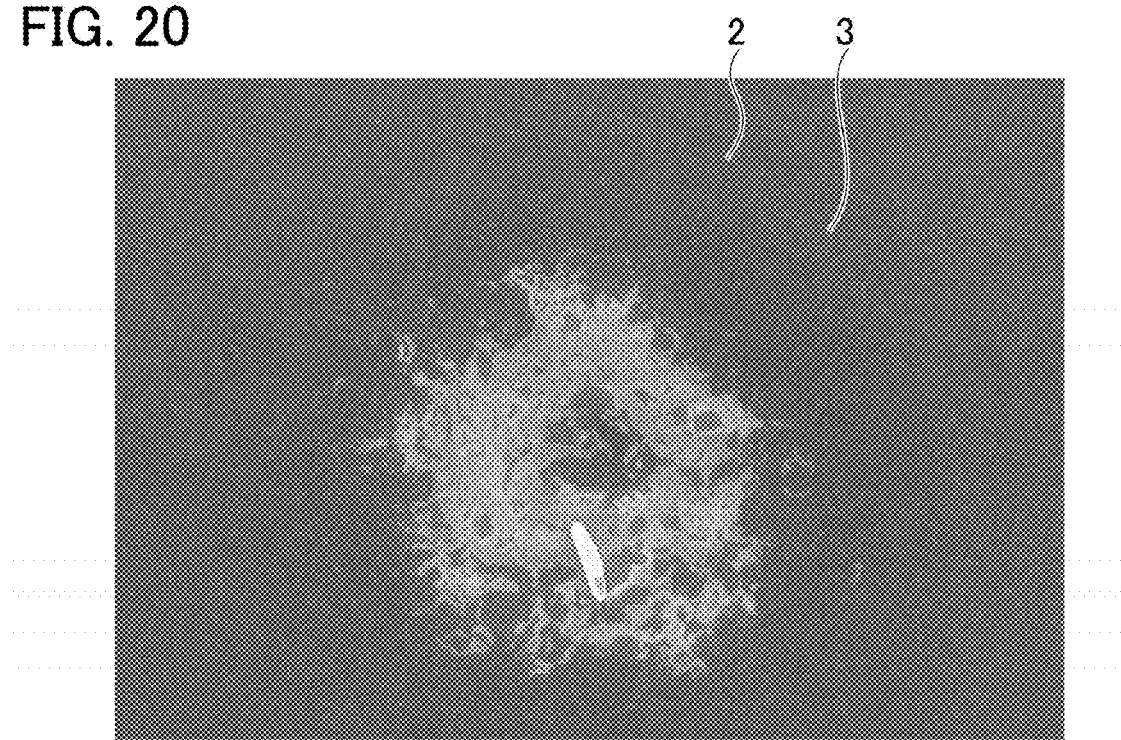

First, a cross section polisher processing (CP processing) was applied to a cross section of test sample 9 that is cylindrical. Next, using a scanning electron microscope (SEM), a secondary electron image was observed at a magnification of 20,000 on the cross section of test sample 9. The secondary electron images obtained by observing three points (position 1 to 3) in the cross section of test sample 9 are illustrated in FIGS. 16, 18, and 20. In the observed secondary electron images, gray particles are boehmite particles 2 and black portions are pores 3.

Figure 17:
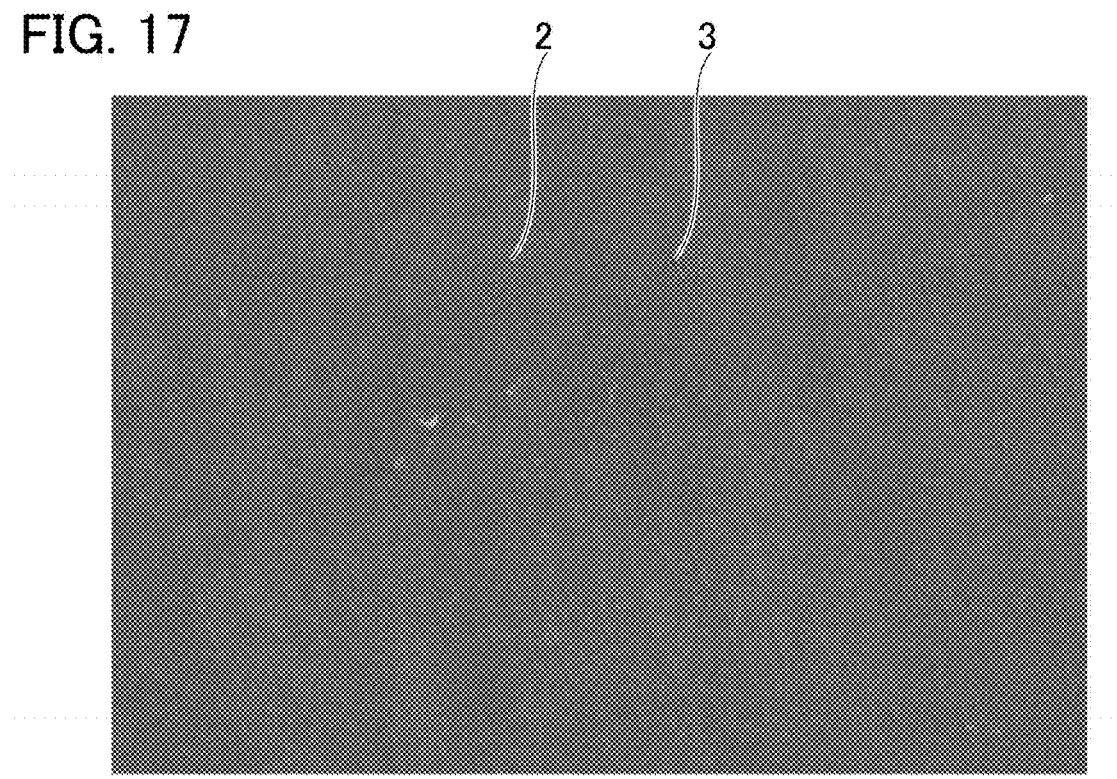
FIG. 17 is a diagram illustrating binarized data of the secondary electron image at position 1 in test sample 9 of example 6.
Figure 19:
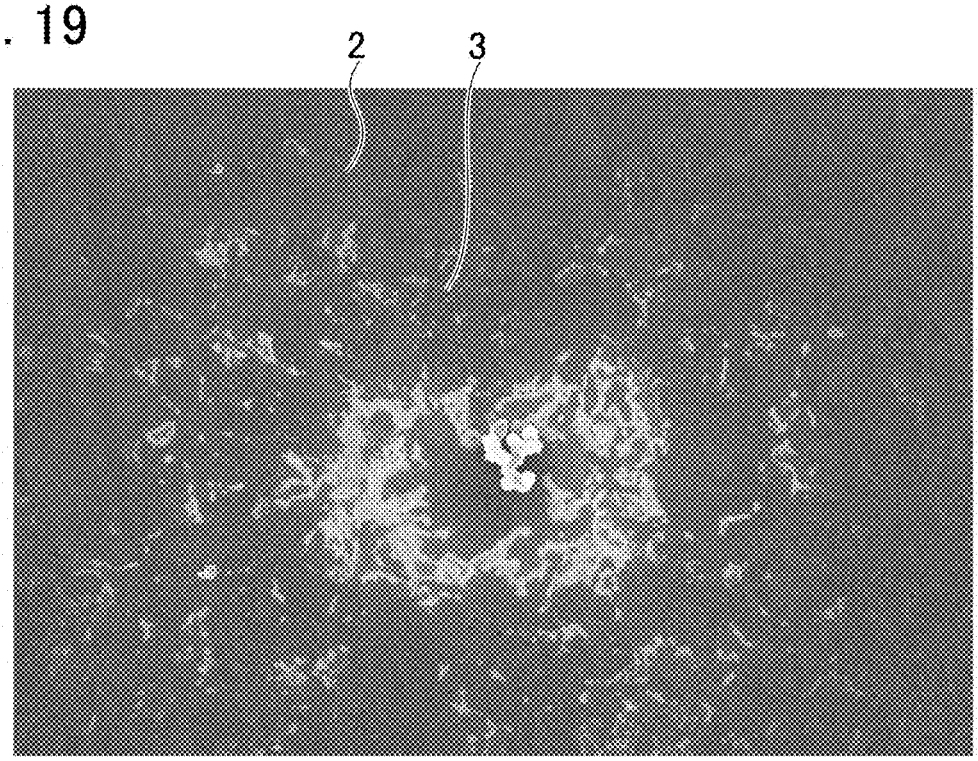
FIG. 19 is a diagram illustrating binarized data of the secondary electron image at position 2 in test sample 9 of example 6.

Next, the pore portions of each of the SEM images of the three fields were painted out and the SEM images of the three fields were binarized to clarify the pore portions. The binarized images of the secondary electron images of FIGS. 16, 18, and 20 are illustrated in FIGS. 17, 19, and 21, respectively. Then, the area percentage of the pore portion was calculated from the binarized image, and the average value was used as the porosity. Specifically, from FIG. 17, the area percentage of the pore portion at position 1 was 0.60%. From FIG. 19, the area percentage of the pore portion at position 2 was 0.28%. From FIG. 21, the area percentage of the pore portion at position 3 was 0.13%. Thus, the porosity of test sample 9 was 0.34%, which is the average value of the area percentage of the pore portion at positions 1 to 3.

From examples 5 and 6, it is seen that using hydraulic alumina having an average particle diameter $D_{50}$ of 5 μm or less as raw material provides a boehmite structure having an average total light transmittance of 20% or more in a wavelength range of 380 nm to 700 nm, and a porosity of 5% or less.

Although the contents of the present embodiments have been described above with reference to the examples, it is obvious to those skilled in the art that the present embodiments are not limited to these descriptions and that various modifications and improvements are possible.

The entire contents of Japanese Patent Application No. 2019-094630 (filing date: May 20, 2019) and Japanese Patent Application No. 2019-197102 (filing date: Oct. 30, 2019) are incorporated herein by reference.

INDUSTRIAL APPLICABILITY

According to the present disclosure, there are provided a boehmite structure that is lightweight, has excellent chemical stability, and has a reduced amount of impurities, and a method of producing a boehmite structure.

REFERENCE SIGNS LIST

1 Boehmite structure
2 Boehmite particles
3 Pores

The invention claimed is:
1. A boehmite structure, comprising:
a plurality of boehmite particles where adjacent boehmite particles are bonded to each other,
wherein the porosity in a cross section of the boehmite structure is 20% or less, and
an average particle diameter of the boehmite particles making up the boehmite structure is from 300 nm to 50 μm.
2. The boehmite structure according to claim 1, wherein the boehmite structure has a flexural strength of 3 MPa or more measured in accordance with JIS R1601.
3. The boehmite structure according to claim 1, wherein the boehmite structure has a presence percentage of a boehmite phase of 50% by mass or more.
4. The boehmite structure according to claim 1, wherein the boehmite structure includes pores with a pore diameter of 5 μm or less.

5. The boehmite structure according to claim 1, wherein the boehmite structure has an average value of a total light transmittance in a wavelength range of 380 nm to 700 nm at a thickness of 0.5 mm to 1 mm of 20% or more.

6. The boehmite structure according to claim 5, wherein the boehmite structure includes pores with a pore diameter of 1 μm or less.

7. The boehmite structure according to claim 5, wherein the porosity is 5% or less.

8. The boehmite structure according to claim 1, further comprising a substance other than the plurality of boehmite particles.

9. The boehmite structure according to claim 1, wherein the porosity in a cross section of the boehmite structure is 10% or less.

10. The boehmite structure according to claim 8, wherein the substance is an organic substance.

11. The boehmite structure according to claim 1, wherein the adjacent boehmite particles are bonded through at least one of an oxide or a hydroxide of aluminum.

12. The boehmite structure according to claim 1, wherein the thickness of the boehmite structure is 50 μm or more.

\* \* \* \* \*